United States Patent
Kim et al.

(10) Patent No.: US 9,250,483 B2
(45) Date of Patent: Feb. 2, 2016

(54) DISPLAY DEVICE AND METHOD OF MANUFACTURING THE SAME

(71) Applicant: Samsung Display Co., Ltd., Yongin (KR)

(72) Inventors: Yong Seok Kim, Seoul (KR); Tae Woo Lim, Hwaseong-si (KR); Jong Seong Kim, Seoul (KR); WooJae Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 259 days.

(21) Appl. No.: 14/016,858

(22) Filed: Sep. 3, 2013

(65) Prior Publication Data

US 2014/0293205 A1    Oct. 2, 2014

(30) Foreign Application Priority Data

Mar. 29, 2013 (KR) ................ 10-2013-0034683

(51) Int. Cl.
*G02F 1/1333* (2006.01)
*G02F 1/1341* (2006.01)

(52) U.S. Cl.
CPC ........ *G02F 1/1341* (2013.01); *G02F 1/133377* (2013.01)

(58) Field of Classification Search
CPC .................. G02F 1/133377; G02F 1/1341
USPC .................................................. 349/55–56
See application file for complete search history.

(56) References Cited

U.S. PATENT DOCUMENTS

| | | | | |
|---|---|---|---|---|
| 4,148,128 | A | * | 4/1979 | Feldman ............. 29/592.1 |
| 4,832,458 | A | * | 5/1989 | Fergason et al. ........ 349/56 |
| 2008/0297896 | A1 | * | 12/2008 | Louwsma ............ 359/463 |
| 2012/0062448 | A1 | * | 3/2012 | Kim et al. ............. 345/55 |
| 2013/0313582 | A1 | * | 11/2013 | Cho et al. ............. 257/88 |

FOREIGN PATENT DOCUMENTS

| | | | | |
|---|---|---|---|---|
| JP | 09213906 | A * | 8/1997 | ........ H01L 27/108 |
| KR | 10-2013-0134153 | | 12/2013 | |
| KR | 10-2014-0025739 | | 3/2014 | |

* cited by examiner

*Primary Examiner* — Hoan C Nguyen
(74) *Attorney, Agent, or Firm* — H.C. Park & Associates, PLC

(57) ABSTRACT

A display device includes a substrate, a cover layer, liquid crystal, electrodes, and a sealant layer. The cover layer is disposed on the substrate and defines at least a portion of a tunnel-shaped cavity. The liquid crystal is disposed in the tunnel-shaped cavity. The electrodes are disposed on the substrate and are configured to apply an electric field to the liquid crystal. The sealant layer is disposed on the substrate and is configured to seal the tunnel-shaped cavity. The cover layer includes a first insulating layer including a concave-convex surface.

19 Claims, 28 Drawing Sheets

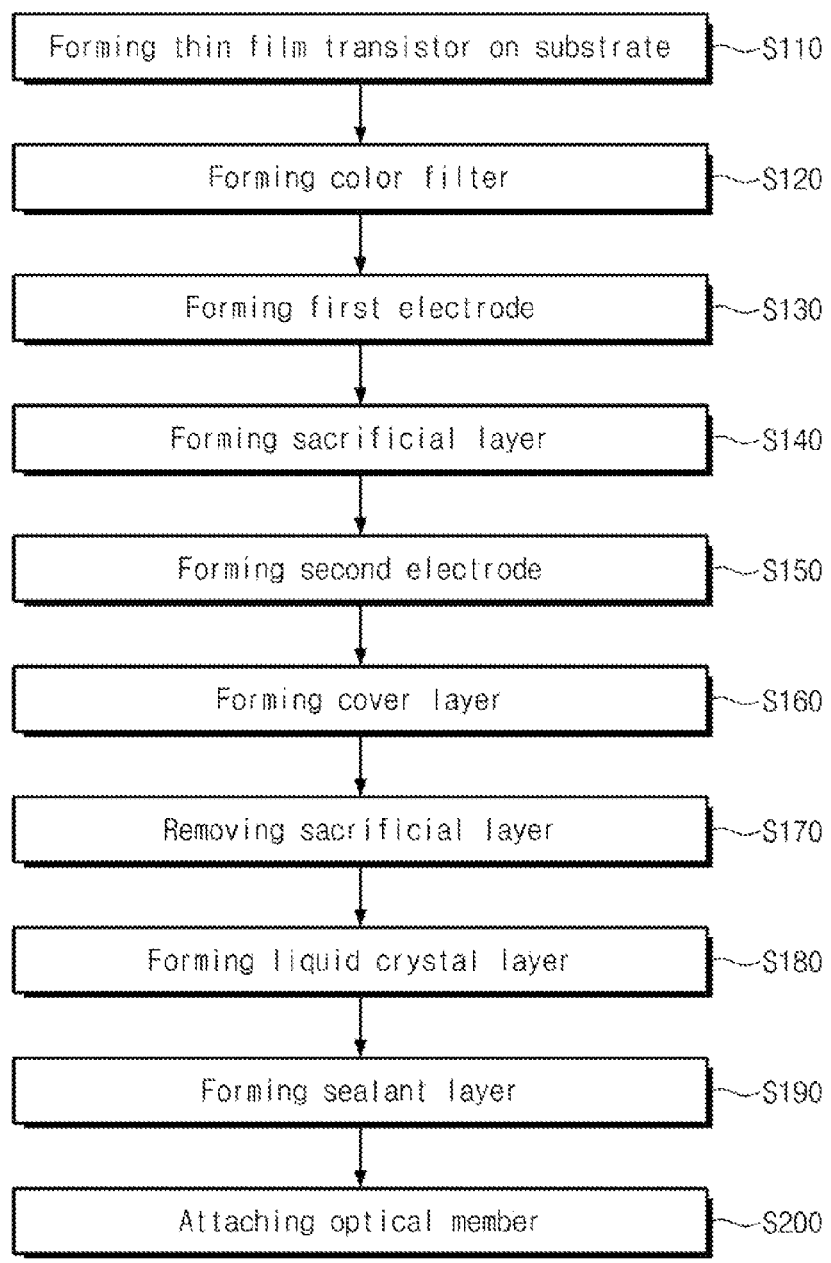

DISPLAY DEVICE AND METHOD OF MANUFACTURING THE SAME

CROSS-REFERENCE TO RELATED APPLICATION

This application claims priority from and the benefit of Korean Patent Application No. 10-2013-0034683, filed on Mar. 29, 2013, which is incorporated by reference for all purposes as if set forth herein.

BACKGROUND

1. Field

Exemplary embodiments relate to display technology, and more particularly, to a display device configured to improve display quality and enable a more simplified manufacturing process, as well as a method of manufacturing the display device.

2. Discussion

Conventional flat panel display devices typically include two substrates facing each other and an image display unit disposed between the two substrates, such as an image display unit corresponding to a liquid crystal layer, an electrophoretic layer, etc. The two substrates are usually coupled to each other while facing each other. In this manner, the two substrates are typically spaced apart from each other by a distance to enable the image display unit to be disposed therebetween. In this manner, a spacer is usually formed on one of the two substrates to maintain a distance between the two substrates. The other one of the two substrates is typically attached to the spacer using, for example, an adhesive or any other suitable bonding agent. As such, a manufacturing process may be complex and costly.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a display device configured to improve display quality and enable a more simplified manufacturing process.

Exemplary embodiments provide a method of manufacturing a display device configured to improve display quality and enable a more simplified manufacturing process.

Additional aspects will be set forth in the detailed description which follows and, in part, will be apparent from the disclosure, or may be learned by practice of the invention.

According to exemplary embodiments, a display device includes: a substrate, a cover layer disposed on the substrate, the cover layer defining at least a portion of a tunnel-shaped cavity, liquid crystal disposed in the tunnel-shaped cavity, electrodes disposed on the substrate, the electrodes being configured to apply an electric field to the liquid crystal, and a sealant layer disposed on the substrate to seal the tunnel-shaped cavity. The cover layer includes a first insulating layer including a concave-convex surface.

According to exemplary embodiments, a method of manufacturing a display device includes: forming a first electrode on a substrate, forming a sacrificial layer on the substrate, the sacrificial layer extending in a first direction, forming a second electrode on the sacrificial layer, forming a cover layer including a concave-convex surface on the sacrificial layer, removing the sacrificial layer to form a tunnel-shaped cavity between the first electrode and the second electrode, forming an image display part in the tunnel-shaped cavity, and forming a sealant layer to seal the tunnel-shaped cavity.

According to exemplary embodiments, the tunnel-shaped cavity may be configured to prevent (or otherwise reduce) the potential of being deformed. In this manner, display quality may be improved. Further, the process of coupling two substrates to each other may be omitted when the display device is manufactured. To this end, the amount of substrates and liquid crystal molecules utilized may be reduced when compared to conventional flat panel display devices. As such, manufacturing time and costs may be reduced.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3 is a flowchart of a method of manufacturing a display device, according to exemplary embodiments.

DETAILED DESCRIPTION OF THE ILLUSTRATED EMBODIMENTS

Figure 1:
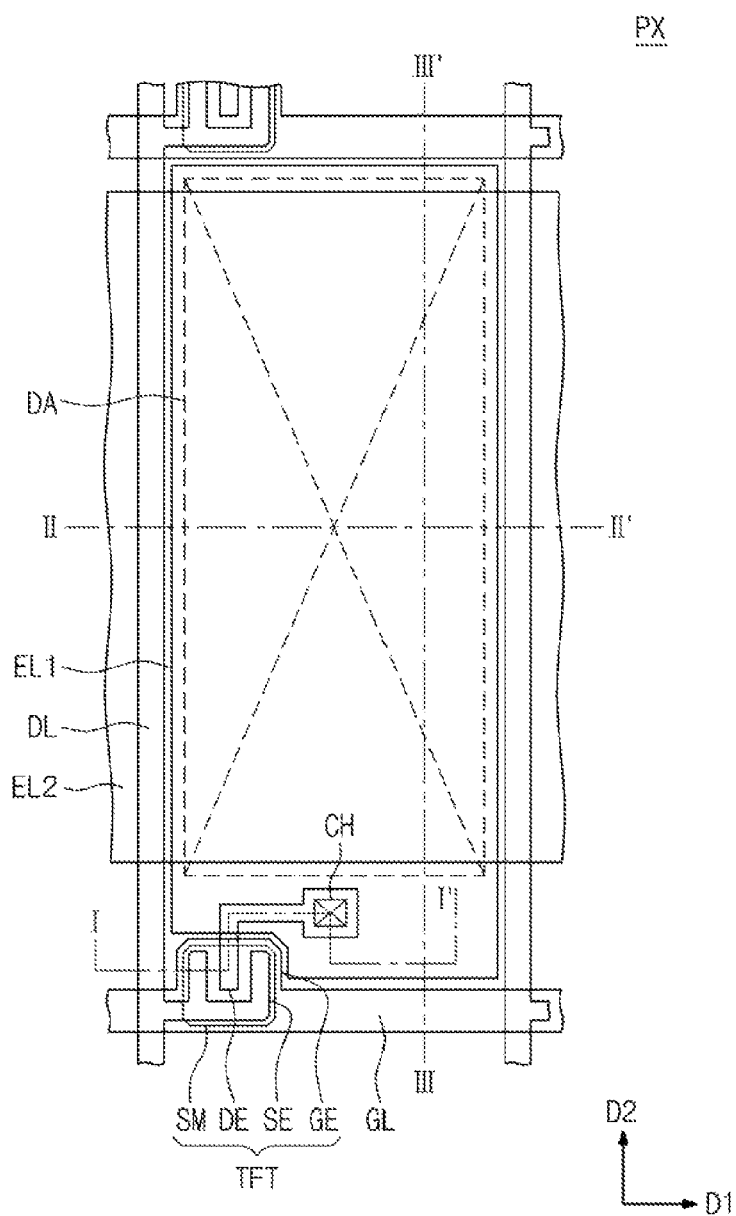
FIG. 1 is a plan view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of the present disclosure.

Spatially relative terms, such as "beneath," "below," "lower," "above," "upper," and/or the like, may be used herein for descriptive purposes, and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

While exemplary embodiments are described in association with liquid crystal display (LCD) devices, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may include electroluminescent (EL) displays, electrophoretic displays (EPD), electrowetting displays (EWD), etc.

Figure 2A:
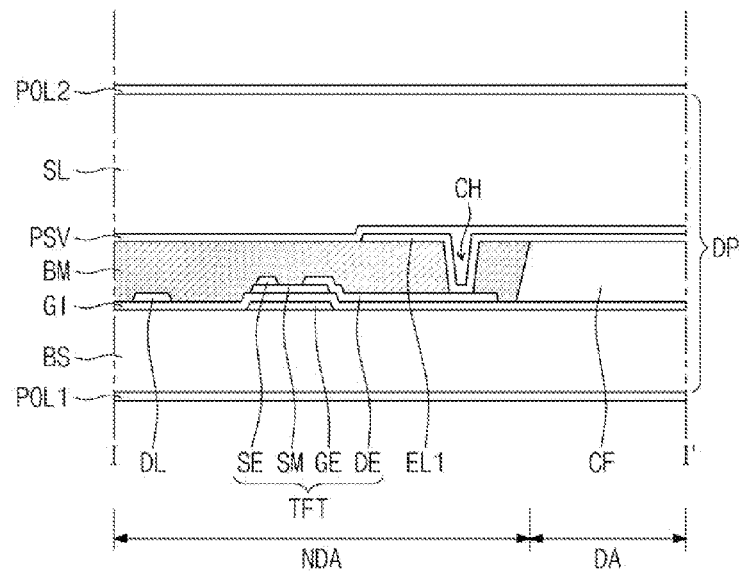
FIG. 2A is a cross-sectional view of the display device of FIG. 1 taken along sectional line I-I', according to exemplary embodiments.
Figure 2B:
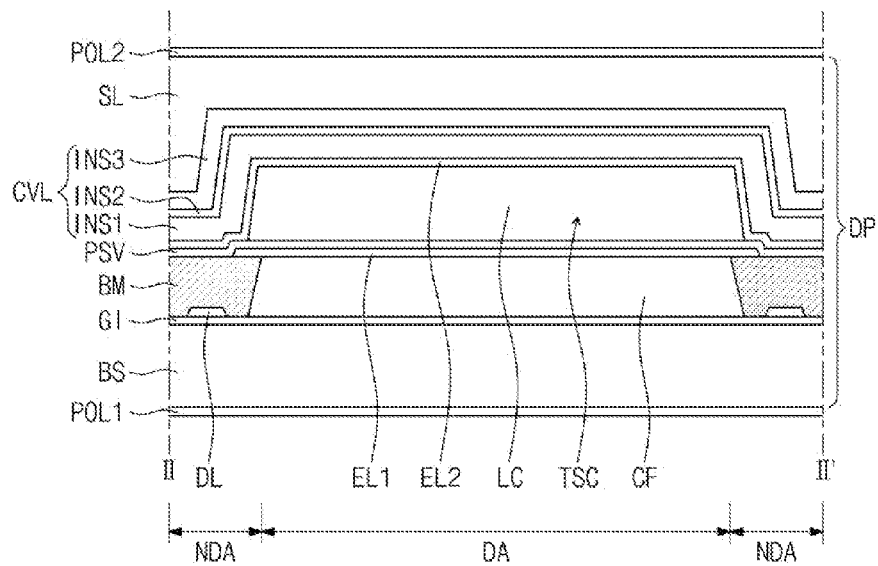
FIG. 2B is a cross-sectional view of the display device of FIG. 1 taken along sectional line II-II', according to exemplary embodiments.
Figure 2C:
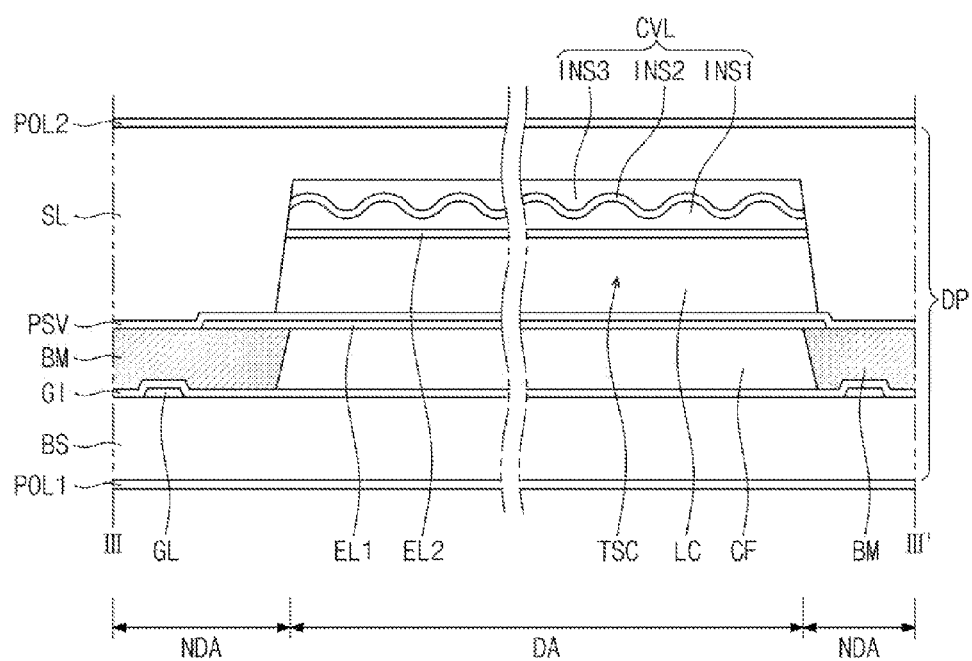
FIG. 2C is a cross-sectional view of the display device of FIG. 1 taken along sectional line III-III', according to exemplary embodiments.

FIG. 1 is a plan view of a display device, according to exemplary embodiments. FIGS. 2A, 2B, and 2C are respective cross-sectional views of the display device of FIG. 1 taken along sectional lines I-I', II-II', and III-III'.

Referring to FIGS. 1, 2A, 2B, and 2C, the display device includes a display panel DP and an optical member disposed on both surfaces of the display panel DP. While specific reference will be made to this particular implementation, it is also contemplated that the display device may embody many forms and include multiple and/or alternative components. For example, it is contemplated that the components of the display device may be combined, located in separate structures, and/or separate locations.

The display panel DP includes a base substrate BS, color filters CF disposed on the base substrate BS, and a black matrix BM disposed between respective color filters CF.

According to exemplary embodiments, the display device includes a plurality of pixels PX arranged in, for example, a matrix formation with plural rows by plural columns. Since the pixels PX have the same configuration and function, to avoid obscuring exemplary embodiments described herein, only one pixel is described in detail. In exemplary embodiments, each pixel PX has a rectangular shape elongated in one direction, but any other suitable shape may be utilized. For instance, the pixel PX may have various shapes, such as a V shape, a Z shape, a triangular shape, a hexagonal shape, etc., when viewed in a plan view.

The base substrate BS is a transparent or non-transparent insulating substrate, e.g., a silicon substrate, a glass substrate, a plastic substrate, etc. The base substrate BS includes pixel areas corresponding to the pixels PX in a one-to-one correspondence. Each pixel area includes, for example, a display area DA in which an image is displayed, and a non-display area NDA disposed adjacent to at least one side of the display area DA. The non-display area NDA corresponds to an area other than the display area DA.

The base substrate BS includes one or more line parts disposed thereon to transmit signals to the pixel PX, and, thereby, a thin film transistor TFT disposed thereon, which is configured to drive the pixel PX. The line part(s) and the thin film transistor TFT are disposed in, for example, the non-display area NDA. The line parts include, for instance, a gate line GL and a data line DL.

The gate line GL is disposed on the base substrate BS, and extends in a first (e.g., horizontal) direction D1.

A gate insulating layer GI is disposed on the base substrate BS to cover the gate line GL. The gate insulating layer GI includes an insulating material, e.g., silicon nitride, silicon oxide, etc.

The data line DL is disposed on the base substrate BS, and is insulated from the gate line GL by the gate insulating layer GI. For instance, the data line DL is disposed on the gate insulating layer GI, such that the gate insulating layer GI is disposed between the gate line GL and the data line DL. The data line DL extends in a second (e.g., vertical) direction D2 crossing the first direction D1. In exemplary embodiments, the first direction D1 is perpendicular (or substantially perpendicular) to the second direction D2.

The thin film transistor TFT is connected to the gate line GL and the data line DL, and includes a gate electrode GE, a semiconductor layer SM, a source electrode SE, and a drain electrode DE.

In exemplary embodiments, the gate electrode GE is either protruded from the gate line GL or disposed on a portion of the gate line GL. The gate line GL and the gate electrode GE are formed of any suitable conductive material, such as a conductive metal material, a conductive polymer material, etc. The gate line GL and the gate electrode GE may include nickel, chromium, molybdenum, aluminum, titanium, copper, tungsten, etc., or an alloy thereof. The gate line GL and the gate electrode GE may have a single-layer structure or a multi-layer structure of one or more of the above-mentioned conductive materials. For instance, the gate line GL and the gate electrode GE may have a triple-layer structure of molybdenum-aluminum-molybdenum, which are sequentially stacked on one another, a double-layer structure of titanium and copper sequentially stacked, or a single-layer structure of an alloy of titanium and copper.

As previously mentioned, the gate insulating layer GI is disposed over the base substrate BS to cover the gate electrode GE.

The semiconductor layer SM is disposed on the gate insulating layer GI in correspondence with the gate line GL. The source electrode SE is branched from the data line DL and overlaps at least a portion of the semiconductor layer SM. The drain electrode DE overlaps at least another portion of the semiconductor layer SM and is spaced apart from the source electrode SE above the semiconductor layer SM. That is, a channel of the thin-film transistor TFT is disposed between the source and drain electrodes SE and DE. In this manner, the semiconductor layer SM serves as a conductive channel between the source electrode SE and the drain electrode DE.

The source electrode SE and the drain electrode DE may be formed of any suitable conductive material, e.g., a conductive metal material, a conductive polymer material, etc. Each of the source electrode SE and the drain electrode DE may be formed of a single material, two or more materials, or an alloy/composition thereof. For instance, each of the source electrode SE and the drain electrode DE may include nickel, chromium, molybdenum, aluminum, titanium, copper, tungsten, etc., or an alloy thereof. In addition, each of the source electrode SE and the drain electrode DE may have a single-layer structure or a multi-layer structure. For example, each of the source and drain electrodes SE and DE may have a double-layer structure of titanium and copper.

According to exemplary embodiments, each of the color filters CF allows light passing through a corresponding pixel PX to have the color associated with the color filter CF. The color filters CF include any suitable color, such as a red color filter, a green color filter, a blue color filter, etc. The red, green, and blue color filters are arranged to correspond to the pixels PX in one-to-one correspondence. It is contemplated; however, that any other suitable arrangement may be utilized. In addition, the color filters CF may further include a white color filter, a yellow color filter, etc. The color filters CF may be arranged to allow adjacent pixels to each other to have different colors. Although not shown in drawings, the color filters CF adjacent to each other may be partially overlapped with each other in a boundary portion between the pixels PX.

The black matrix BM is disposed in the non-display area NDA to block light not utilized to display an image. In this manner, the black matrix BM is configured to prevent (or otherwise reduce) light leakage from occurring at the edge of the image display layer, which may be caused, at least in part, by the liquid crystal molecules, as well as configured to prevent (or otherwise reduce) colors from being mixed with each other, which may occur at the edge of the pixels PX due to overlapping of the color filters CF. The black matrix BM is disposed at, at least one side of each color filter CF, and may surround each color filter CF. Further, the black matrix BM is provided with a contact hole CH formed therethrough to expose a portion of, for example, the drain electrode DE of the thin film transistor TFT.

Although not illustrated, a protective layer may be disposed between the thin film transistor TFT and the color filters CF to protect the channel of the thin film transistor TFT. The protective layer (not shown) may cover the semiconductor layer SM exposed between the source and drain electrodes SE and DE.

The display panel DP includes a cover layer CVL that defines a tunnel-shaped cavity TSC together with the base substrate BS. In exemplary embodiments, liquid crystal may be disposed in the tunnel-shaped cavity TSC; however, the "filling" disposed in the tunnel-shaped cavity TSC will correspond to the overall configuration of the display device. To this end, the tunnel-shaped cavity TSC may be disposed on a first electrode EL1, and a second electrode EL2 may be disposed on the tunnel-shaped cavity TSC. In this manner, the first and second electrodes EL1 and EL2 may be driven to control, for example, the liquid crystal LC disposed in the tunnel-shaped cavity TSC.

According to exemplary embodiments, the first electrode EL1 is disposed on the color filter CF and connected to the thin film transistor TFT through the contact hole CH formed through the black matrix BM. A passivation layer PSV is disposed on the first electrode EL1 to protect the first electrode EL1, as well as utilized to prevent contaminants migrating from, for instance, the first electrode EL1 into the tunnel-shaped cavity TSC region. It is noted, however, that the passivation layer PSV may be omitted. The passivation layer PSV may include any suitable inorganic insulating material and/or any suitable organic insulating material.

As seen in FIG. 2A, the contact hole CH is formed by partially removing the black matrix BM; however, any other suitable process or location may be utilized in association with the contact hole CH. For instance, the contact hole CH may be formed by partially removing the color filter CF.

According to exemplary embodiments, the cover layer CVL extends in the first direction D1 and disposed on the passivation layer PSV. It is contemplated; however, that any other suitable arrangement may be utilized. As shown, the cover layer CVL includes a cover portion spaced apart from the base substrate BS and parallel (or substantially parallel) to an upper surface of the base substrate BS. A sidewall portion of the cover layer CVL connects the upper surface of the base substrate BS and the cover portion of the cover layer CVL. The cover portion is spaced apart from the upper surface of the passivation layer PSV, and the cover portion and the sidewall portion define the tunnel-shaped cavity TSC in cooperation with the passivation layer PSV. In other words, the cover portion is upwardly spaced apart from the passivation layer PSV in the display area DA, and the sidewall portion connects the passivation layer PSV and the cover portion. In this manner, a determined space (or cavity region) is formed between the cover layer CVL and the passivation layer PSV, which may be filled with the liquid crystal LC.

According to exemplary embodiments, the cover layer CVL does not form the space between the cover layer CVL and the passivation layer PSV along the second direction D2 in the non-display area NDA. As a result, the tunnel-shaped cavity TSC has a shape extending in the second direction D2, and both end portions of the tunnel-shaped cavity TSC, e.g., an end portion of the tunnel-shaped cavity TSC in the second direction D2 and an end portion of the tunnel-shaped cavity TSC in the opposite direction to the second direction D2, are open since the cover layer CVL is not formed in the end portions of the tunnel-shaped cavity TSC. It is contemplated, however, that the direction in which the cover layer CVL is formed is not limited thereto or thereby. For instance, the cover layer CVL may extend in a direction different from the above-mentioned direction.

As seen in FIG. 2B, the cover layer CVL includes first, second, and third insulating layers INS1, INS2, and INS3.

The first insulating layer INS1 is formed of any suitable organic insulating material, and includes a concave-convex upper surface portion. The concave-convex upper surface portion is disposed in an area corresponding to the cover portion of the cover layer CVL. The organic insulating material for the first insulating layer INS1 may be, for example, a homopolymer made by the polymerization of one monomer, or a copolymer when two or more monomers are polymerized. The copolymer may be a statistical copolymer, a random copolymer, an alternating copolymer, a block copolymer, a periodic copolymer, a graft copolymer, or a mixture thereof. The organic insulating material may be a photosensitive material.

The second insulating layer INS2 is disposed on the first insulating layer INS1, and includes any suitable inorganic insulating material. The second insulating layer INS2 may be thinner than the first insulating layer INS1. In this manner, the upper and lower surfaces of the second insulating layer INS2 may exhibit concave-convex formations. In this manner, the concave-convex formations of the second insulating layer INS2 correspond to the concave-convex upper surface portion of the first insulating layer INS1. The inorganic insulating material for the second insulating layer INS2 may be, for instance, silicon oxide, silicon nitride, and/or the like.

The third insulating layer INS3 is disposed on the second insulating layer INS2. The third insulating layer INS3 is formed of any suitable organic insulating material. The third insulating layer INS3 may be thicker than the second insulating layer INS2. To this end, the third insulating layer INS3 may be configured to planarize the concave-convex formation of the second insulating layer INS2. In other words, the third insulating layer INS3 includes a lower surface including a concave-convex lower surface portion, but the upper surface of the third insulating layer INS3 may be planar or substantially planar. The organic insulating material of the third insulating layer INS3 may be the aforementioned homopolymer or copolymer. In addition, the organic insulating material of the third insulating layer INS3 may include a photosensitive organic material. The organic insulating material of the third insulating layer INS3 may be the same as or different from the organic insulating material of the first insulating layer INS1.

According to exemplary embodiments, the first insulating layer INS1 has a cross-sectional shape corresponding to a portion of a circular shape, a portion of ovular shape, a polygonal shape, or a closed figure shape defined by a curved line and one or more straight lines when the first insulating layer INS1 is cut along a direction vertical to the cover portion. In exemplary embodiments, the concave portion and the convex portion of the first insulating layer INS1 have a semi-circular shape. In other words, the concave-convex upper surface of the first insulating layer INS1 may have, for example, a wave or sinusoidal configuration.

In exemplary embodiments, the concave-convex portion includes a plurality of convex portions protruded from the upper surface of the first insulating layer INS1. The convex portions are extended in one direction and arranged in a direction substantially perpendicular to the one direction to be parallel to each other. For instance, when the tunnel-shape cavity TSC is extended in the first direction D1, the convex portions are extended in the first direction D1 and arranged in the second direction D2 to be parallel to each other. It is contemplated; however, that the extension direction and the arrangement direction of the convex portions may be arranged in any other suitable manner. For instance, although the tunnel-shaped cavity TSC is extended in the first direction D1, the convex portions may be extended in the second direction D2. In this manner, the convex portions may be arranged in the first direction D1. In addition, the convex portions may be extended in a direction inclined with respect to the first direction D1.

According to exemplary embodiments, the convex portions have the same shape and the same size, but it is contemplated that any other suitable configuration may be utilized. For instance, the convex portions may have different shapes and different sizes, the different shapes and/or sizes may alternate, etc.

The lower surface of the cover layer CVL is disposed on the second electrode EL2. In this manner, the second electrode EL2 extends in the first direction D1 in which the cover layer CVL extends. The second electrode EL2 forms an electric field in cooperation with the first electrode EL1 to control the arrangement of liquid crystal molecules in the liquid crystal LC disposed in the tunnel-shaped cavity TSC. The second electrode EL2 may be shared by the pixels arranged in the direction in which the second electrode EL2 is extended. The second electrode EL2 is upwardly spaced apart from the passivation layer PSV in the display area DA and may directly contact the passivation layer PSV in the non-display area NDA, such as illustrated in FIG. 2B.

The second electrode EL2 may be connected to a common voltage line (not shown) in the non-display area NDA. In this manner, the second electrode EL2 may be configured to receive a common voltage from the common voltage line.

According to exemplary embodiments, the first and second electrodes EL1 and EL2 may be formed of a transparent conductive material or a non-transparent conductive material, e.g., a conductive metal material, a conductive polymer material, etc. That is, the first and second electrodes EL1 and EL2 may include the transparent or non-transparent conductive material in accordance with an operation mode of the display device. For instance, when the display device is a transmission-type display device in which a backlight unit is disposed under the base substrate BS, the first and second electrodes EL1 and EL2 may be formed of the transparent conductive material. When the display device is a reflection-type display device that does not necessarily need to have a separate light source, the first electrode EL1 may be formed of a non-transparent conductive material that is able to reflect incident light and the second electrode EL2 may be formed of a transparent conductive material.

In exemplary embodiments, the transparent conductive material may include a transparent conductive oxide, e.g., indium tin oxide (ITO), indium zinc oxide (IZO), indium tin zinc oxide (ITZO), gallium zinc oxide (GZO), aluminum zinc oxide (AZO), etc. It is noted that the conductive polymers (ICP) may include, for example, polyaniline, poly(3,4-ethylenedioxythiophene) poly(styrenesulfonate) (PEDOT:PSS), etc. The non-transparent conductive material may include a metal material, such as, for example, nickel, chromium, molybdenum, aluminum, titanium, copper, tungsten, etc., or an alloy thereof. The other elements may be the transparent or non-transparent conductive material in accordance with the operation mode of the display device.

According to exemplary embodiments, liquid crystal LC is disposed in the tunnel-shaped cavity TSC. In this manner, the liquid crystal LC may be disposed between the first electrode EL1 and the second electrode EL, which face each other. To this end, the molecules of the liquid crystal LC may be controlled by an electric field imposed on the liquid crystal LC to facilitate the display of an image. In exemplary embodiments, the liquid crystal molecules of the liquid crystal LC may have an optical anisotropic property; however, and other suitable type of liquid crystal molecules may be utilized. To this end, the liquid crystal molecules may be controlled by an electric field to block or transmit light passing through the liquid crystal LC to, thereby, facilitate the display of a desired image.

An alignment layer (not shown) may be provided between the first electrode EL1 and the liquid crystal LC (e.g., between the liquid crystal LC and the passivation layer PSV) and/or between the second electrode EL2 and the liquid crystal layer LC. The alignment layer may be used to initially align (e.g., pre-tilt) the liquid crystal molecules of the liquid crystal LC. To this end, the alignment layer may include any suitable organic polymer, such as polyimide, polyamic acid, and/or the like. It is noted that the alignment layer may be light cured and/or include one or more sub-alignment molecules to facilitate pre-alignment of the liquid crystal molecules of the liquid crystal LC.

According to exemplary embodiments, an additional inorganic insulating layer (not shown) may be disposed between the liquid crystal LC and the second electrode EL2 and/or between the second electrode EL2 and the cover layer CVL. This additional inorganic insulating layer may include silicon nitride, silicon oxide, and/or the like. To this end, this additional inorganic insulating layer may be configured to support the cover layer CVL so that the tunnel-shaped cavity TSC is stably supported.

In exemplary embodiments, a sealant layer SL is disposed on the cover layer CVL. The sealant layer SL covers the display area DA and the non-display area NDA. The sealant layer SL blocks both open end portions of the tunnel-shaped cavity TSC to seal the tunnel-shaped cavity TSC. In this manner, the space defined by the tunnel-shaped cavity TSC is sealed by the passivation layer PSV (or the first electrode EL1 when the passivation layer PSV is omitted), the second electrode EL2, and the sealant layer SL. The sealant layer SL may include any suitable organic polymer, such as, for example, a poly(p-xylene)polymer (i.e., parylene).

The aforementioned optical member may be used to change the optical state (e.g., polarization, phase, etc.) of light passing through the liquid crystal LC. To this end, the optical member may include first and second polarizing plates POL1 and POL2. The optical member may further include first and second quarter-wavelength plates (not shown) respectively disposed between the display panel DP and the first polarizing plate POL1 and between the display panel DP and the second polarizing plate POL2.

According to exemplary embodiments, the first polarizing plate POL1 and the second polarizing plate POL2 are respectively disposed on both outer surfaces of the display panel DP. The first polarizing plate POL1 has a polarizing axis formed in a determined direction perpendicular (or substantially perpendicular) to a direction of a polarizing axis of the second polarizing plate POL2. In exemplary embodiments, a part of the optical member may be omitted or further include additional parts in accordance with the type of the liquid crystal LC, e.g., whether it is a positive type or a negative type, and/or the driving mode of the display device, e.g., an in-plane switching mode, a vertical alignment mode, an electrically controlled birefringence mode, etc. In addition, the arrangement of the polarizing axes of the first and second polarizing plates POL1 and POL2 and long axes of the first and second quarter-wavelength plates may be changed according to the type of the liquid crystal LC and/or the driving mode of the display device.

According to exemplary embodiments, when a gate signal is applied to the gate electrode GE through the gate line GL and a data signal is applied to the source electrode SE through the data line DL, the conductive channel (hereinafter, referred to as "channel") is formed in the semiconductor layer SM. In this manner, the thin film transistor TFT is "turned on" and the data signal is applied to the first electrode EL1. As such, an electric field is formed between the first electrode EL1 and the second electrode EL2. The liquid crystal molecules of the liquid crystal LC may be driven in accordance with the electric field and the amount of light passing through the liquid crystal LC may be controlled, thereby, to facilitate the display of a desired image.

FIG. 3 is a flowchart of a method of manufacturing a display device, according to exemplary embodiments.

Referring to FIG. 3, the thin film transistor TFT and the color filter CF are formed on the base substrate BS (S110 and S120). To this end, the first electrode EL1, a sacrificial layer (described in more detail below), the second electrode EL2, and the cover layer CVL are formed (e.g., sequentially formed) on the color filter CF (S130, S140, S150, and S160). The sacrificial layer is removed (S170). The liquid crystal LC is formed, e.g., injected into the tunnel-shaped cavity TSC (S180), and the sealant layer SL is formed to seal the liquid crystal LC therein (S190). The optical member, e.g., the first and second polarizing plates PL1 and PL2, is attached (S200).

FIGS. 4A, 5A, 6A, 7A, and 8A are respective plan views of a display device at various stages of manufacture, according to exemplary embodiments. FIGS. 4B, 5B, 6B, 7B, and 8B are respective cross-sectional views of the display device of FIGS. 4A, 5A, 6A, 7A, and 8A taken along sectional line I-I'. FIGS. 9A, 10A, 11A, 12A, 13A, 14A, and 15A are respective cross-sectional views of the display device of FIG. 8A at various other stages of manufacture taken along sectional line II-II'. FIGS. 9B, 10B, 11B, 12B, 13B, 14B, and 15B are respective cross-sectional views of the display device of FIG. 8A at various stages of manufacture taken along sectional line III-III'.

Figure 4A:
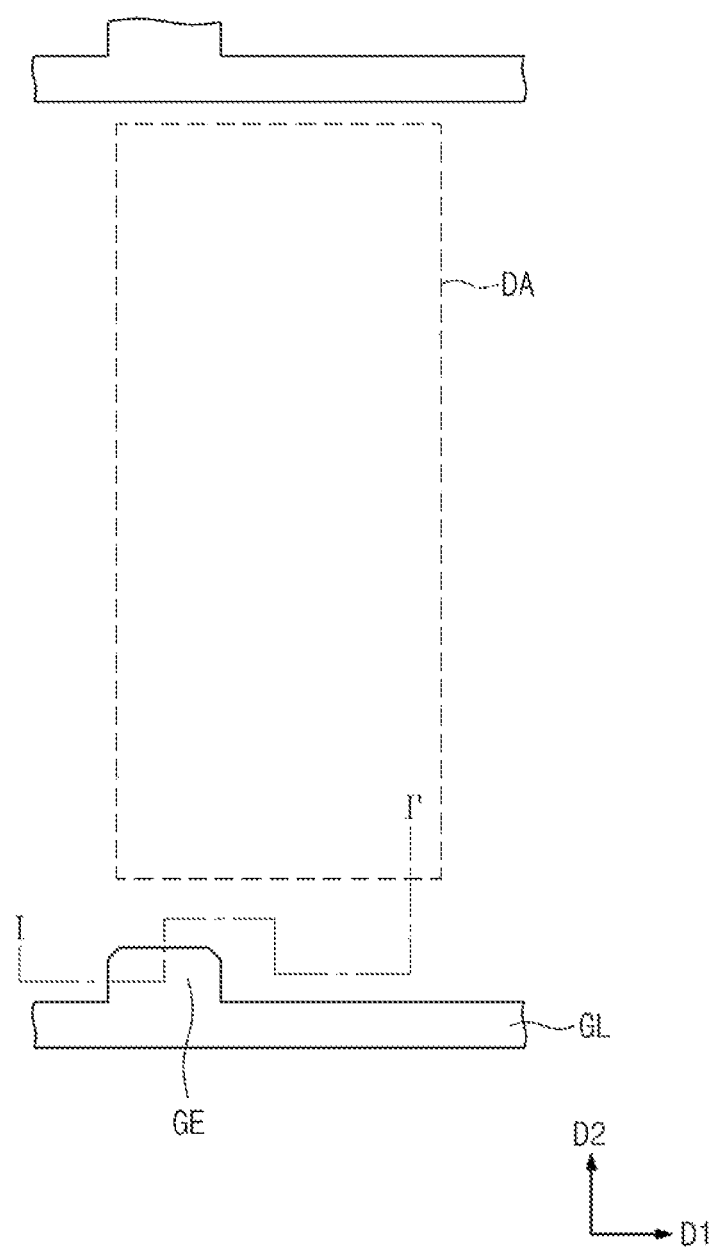
FIGS. 4A, 5A, 6A, 7A, and 8A are respective plan views of a display device at various stages of manufacture, according to exemplary embodiments.
Figure 4B:
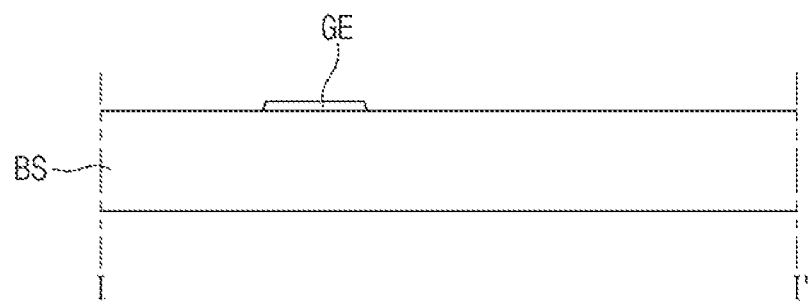
FIGS. 4B, 5B, 6B, 7B, and 8B are respective cross-sectional views of the display device of FIGS. 4A, 5A, 6A, 7A, and 8A taken along sectional line I-I', according to exemplary embodiments.

Referring to FIGS. 4A and 4B, a gate line part is formed on the base substrate BS. The gate line part includes the gate line GL and the gate electrode GE.

The gate line part is formed of a conductive material, e.g., one or more of the aforementioned conductive metals or polymers. For instance, the gate line part is formed by forming a metal layer over the base substrate BS and patterning the metal layer through a photolithography process. The gate line part may have a single-layer structure of a single conductive material or an alloy (or composition) or a multilayered structure. For instance, the gate line part may have a multi-layer structure of two or more conductive metals, polymers, alloys, and/or compositions.

Figure 5A:
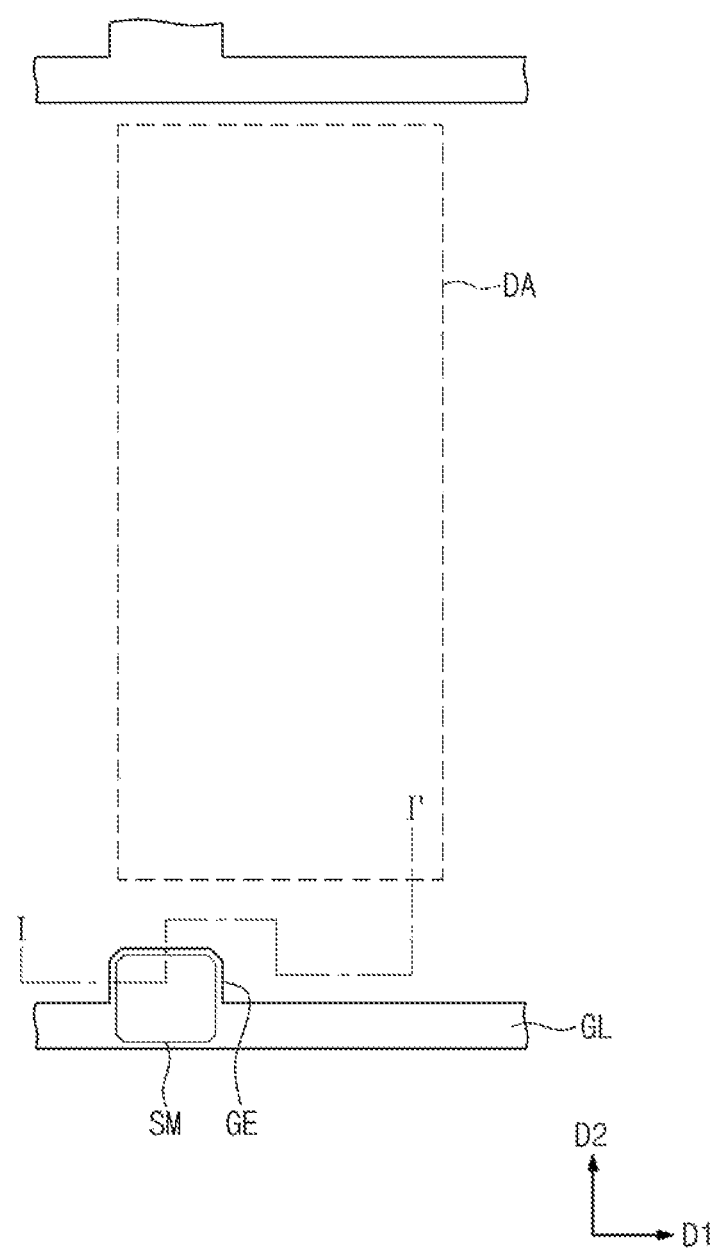
Figure 5B:
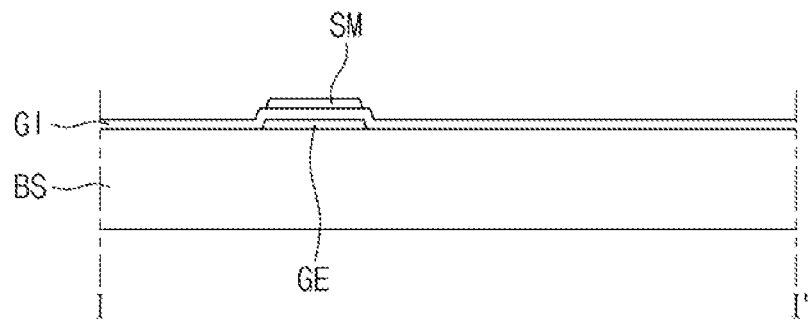

Referring to FIGS. 5A and 5B, the gate insulating layer GI is formed on the base substrate BS to cover the gate line part, and the semiconductor layer SM is formed on the gate insulating layer GI. The semiconductor layer SM is disposed on the gate electrode GE and overlaps at least a portion of the gate electrode GE when viewed in a plan view. The semiconductor layer SM may be formed of a doped or non-doped silicon or oxide semiconductor material. It is contemplated; however, that any other one or more suitable semiconductor materials may be utilized.

Figure 6A:
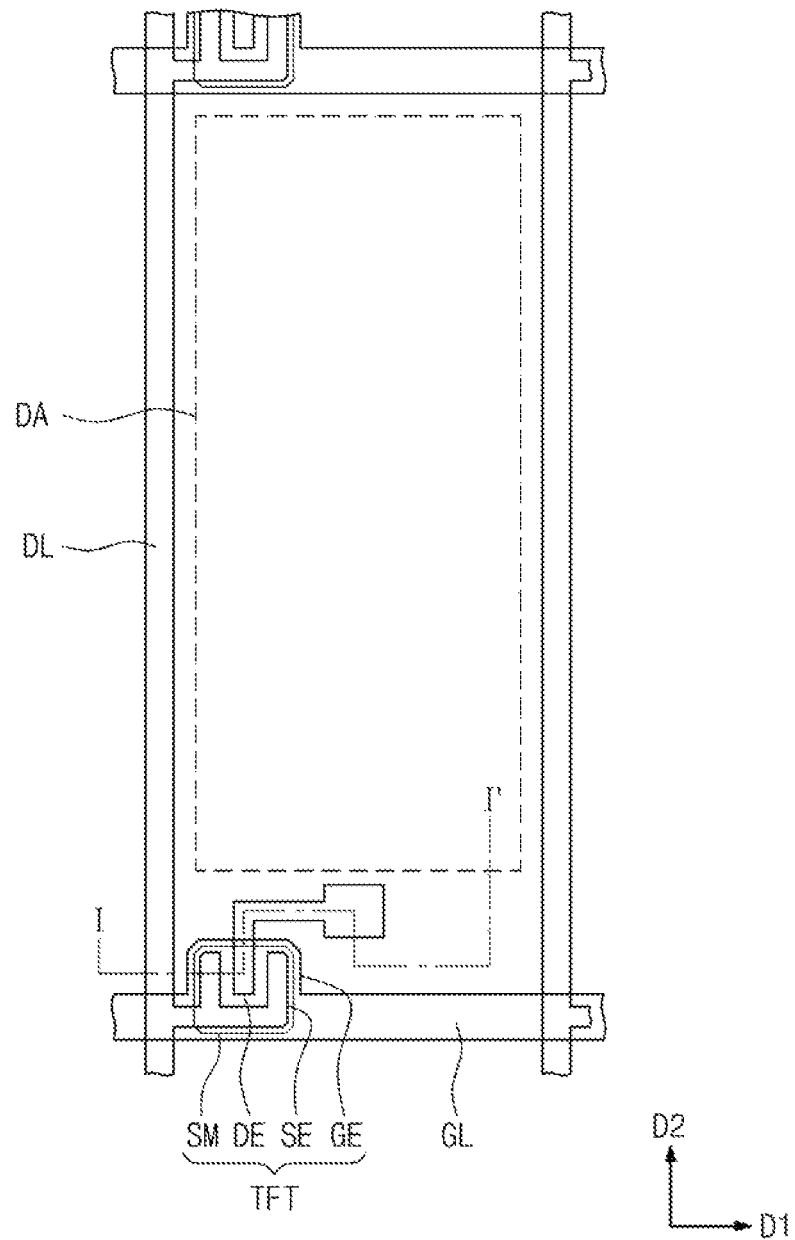
Figure 6B:
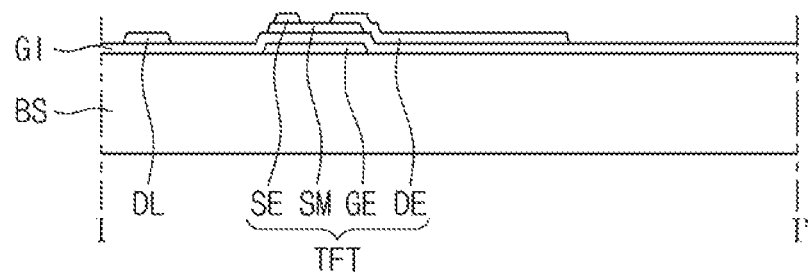

Referring to FIGS. 6A and 6B, a data line part is formed on the semiconductor layer SM and the gate insulating layer GI. The data line part includes the data line DL, the source electrode SE, and the drain electrode DE.

In exemplary embodiments, the data line part may be formed of any suitable conductive material, e.g., any suitable conductive metal or polymer material. For instance, the data line part may be formed by forming a metal layer over the base substrate BS and patterning the metal layer through a photolithography process. The data line part may have a single-layer structure of a single conductive metal, polymer, alloy, or composition or may have a multi-layer structure of two or more conductive metals, polymers, alloys, and/or compositions.

The gate electrode GE, the source electrode SE, the drain electrode DE, and the semiconductor layer SM, which are formed by the above-mentioned process, form the thin film transistor TFT (S110 in FIG. 3).

Figure 7A:
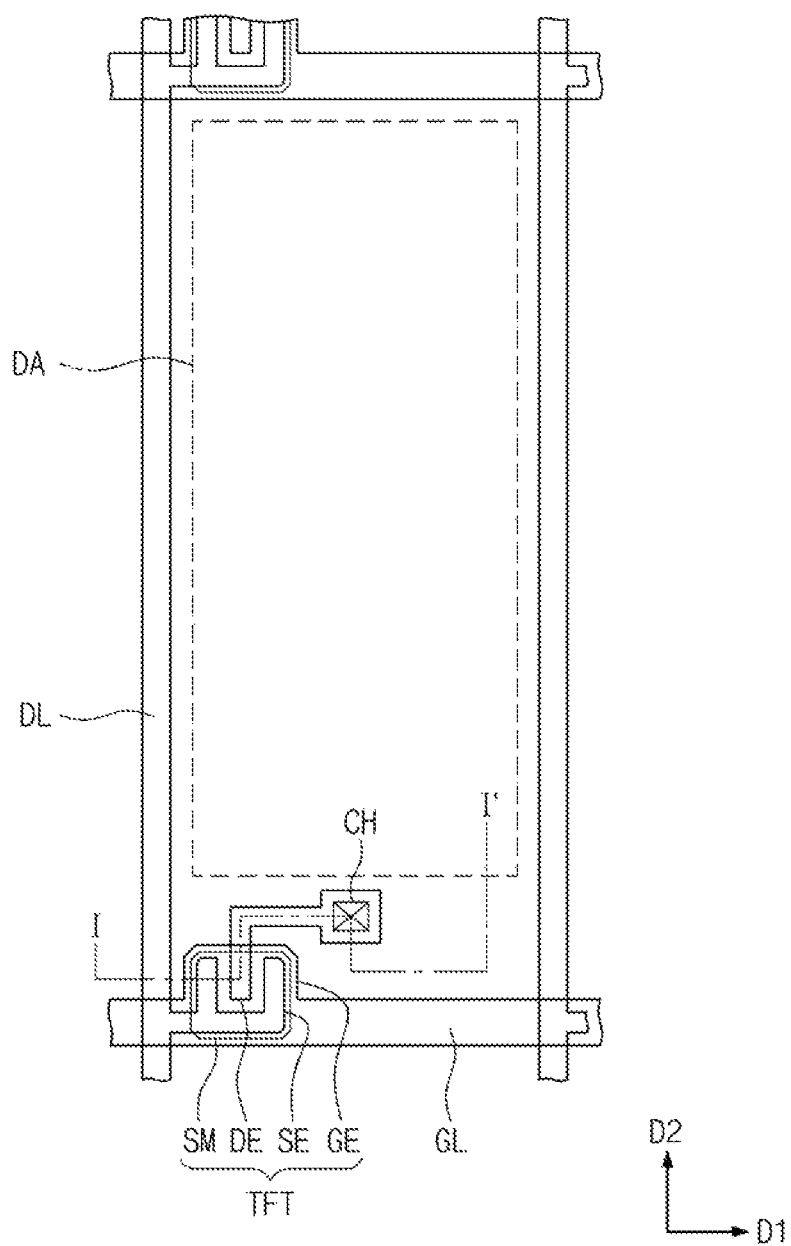
Figure 7B:
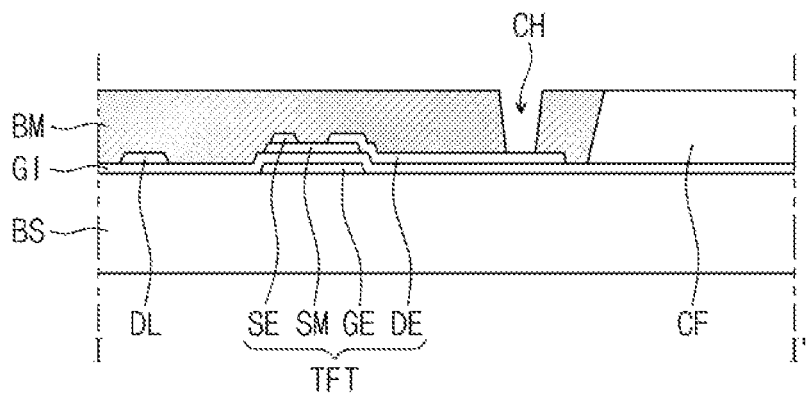

Referring to FIGS. 7A and 7B, the color filter CF and the black matrix BM are formed on the base substrate BS on which the data line part is formed (S120 in FIG. 3), and the contact hole CH is formed to expose, for example, a portion of the drain electrode DE.

According to exemplary embodiments, the color filter CF is formed by forming a color layer representing a color, e.g., a red color, a green color, a blue color, or other colors, on the base substrate BS and patterning the color layer using a photolithograph process. It is contemplated, however, that any other suitable process may be utilized. For example, the color filter CF may be formed by an inkjet method instead of the photolithography process. The black matrix BM may be formed by forming a light blocking layer configured to absorb (or otherwise block) incident light on the base substrate BS and patterning the light blocking layer using the photolithography process. It is contemplated, however, that any suitable method may be utilized to form the black matrix BM, such as via an inkjet method. The color layer of the color filter CF and the black matrix BM may be formed in various orders. For instance, the black matrix BM may be formed after the red, green, and blue color filters CF are formed, or the red, green, and blue color filters CF may be formed after the black matrix BM is formed. Further, the order of forming the color filters CF may be varied.

The contact hole CH is formed by patterning the black matrix BM using a photolithography process. It is noted that a portion of the gate insulating layer GI may also be patterned.

Although not shown in drawings, an additional insulating layer, e.g., a passivation layer, may be selectively formed between the thin film transistor TFT and the color filter CF. This additional insulating layer may be configured to protect the channel portion of the thin film transistor TFT and prevent impurities from being diffused to the thin film transistor TFT from the color filter CF or vice versa.

Figure 8A:
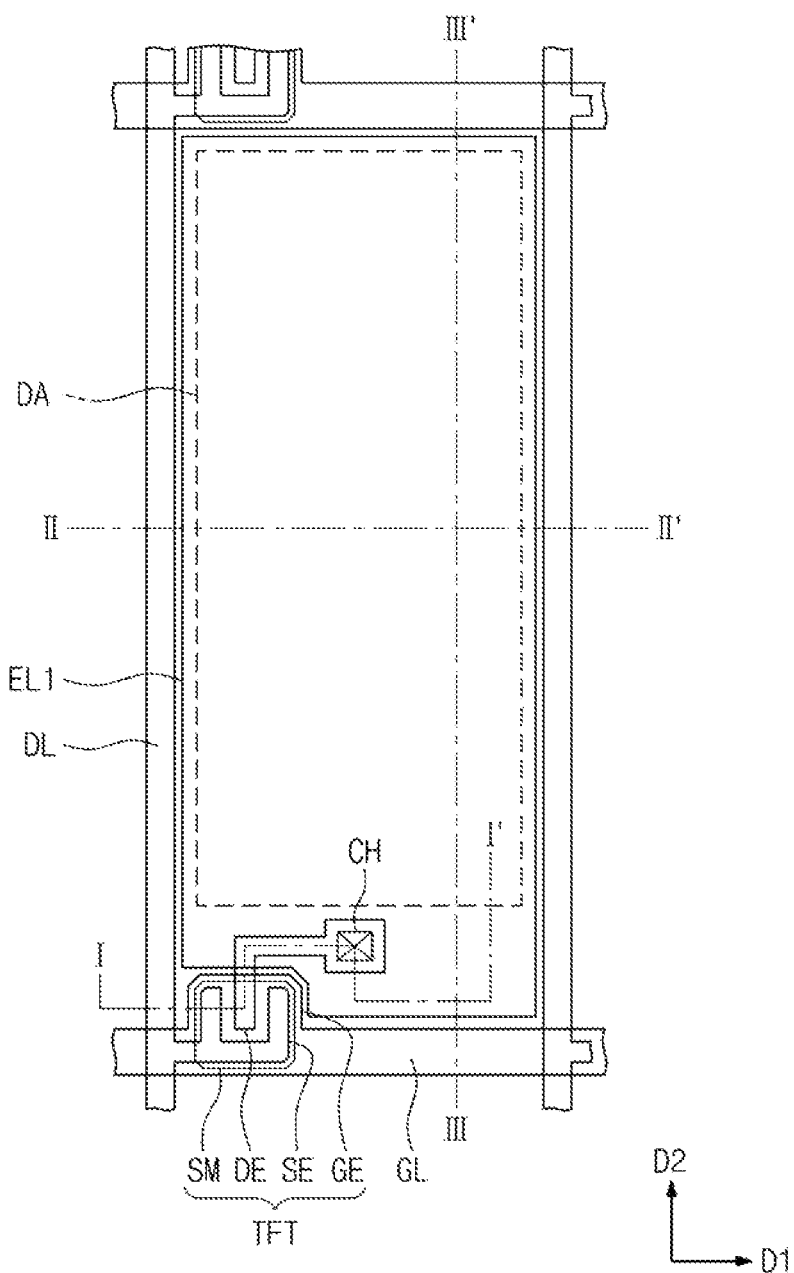
Figure 8B:
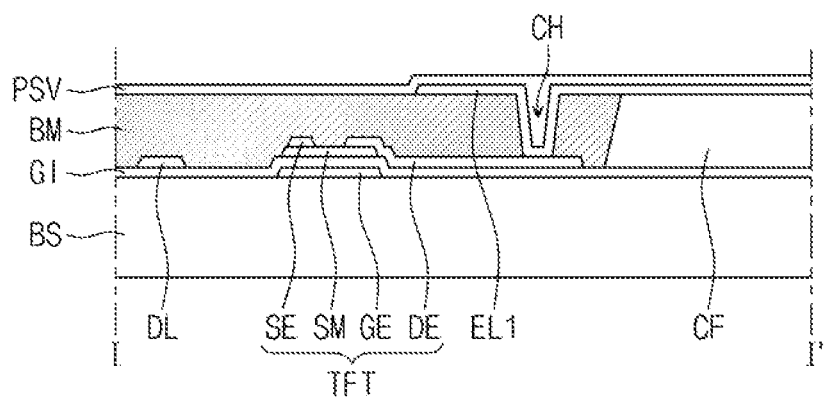

Referring to FIGS. 8A and 8B, the first electrode EL1 is formed on the color filter CF (S130 in FIG. 3).

The first electrode EL1 may be formed by forming a conductive layer on the color filter CF using a conductive material and patterning the conductive layer through the photolithography process. The first electrode EL1 is connected to the drain electrode DE through the contact hole CH.

Figure 9A:
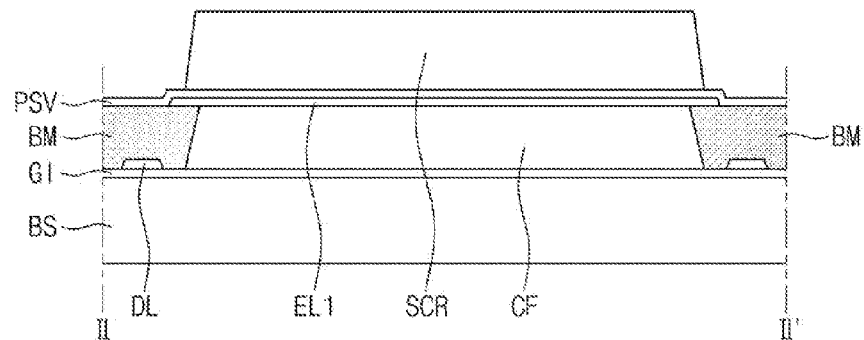
FIGS. 9A, 10A, 11A, 12A, 13A, 14A, and 15A are respective cross-sectional views of the display device of FIG. 8A at various other stages of manufacture taken along sectional line II-II', according to exemplary embodiments.
Figure 9B:
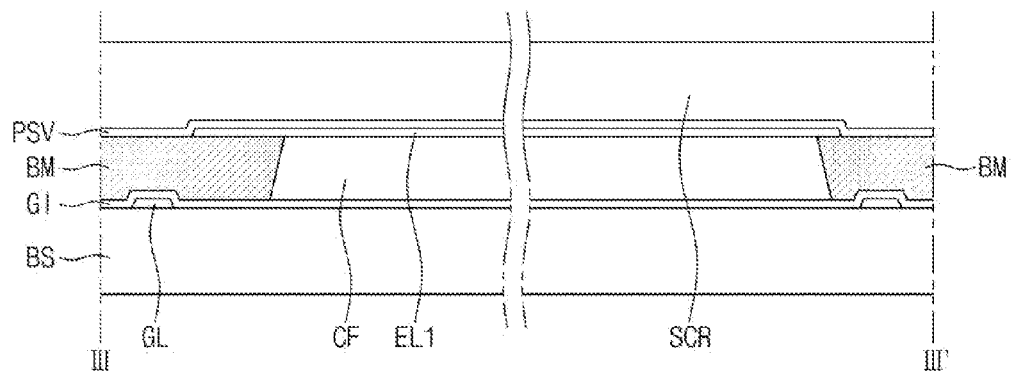
FIGS. 9B, 10B, 11B, 12B, 13B, 14B, and 15B are respective cross-sectional views of the display device of FIG. 8A at various stages of manufacture taken along sectional line III-III', according to exemplary embodiments.

The passivation layer PSV may be formed on the first electrode EL1 to protect the first electrode ELL Referring to FIGS. 9A and 9B, a sacrificial layer SCR is formed on the passivation layer PSV (S140 in FIG. 3).

The sacrificial layer SCR is formed to cover the display area DA and is formed to extend in the second direction D2. That is, the sacrificial layer SCR may have a bar shape extended along a column of pixels PX when assuming that the first and second directions D1 and D2 are row and column directions, respectively. It is contemplated; however, that any suitable shape may be utilized in association with the formation of the sacrificial layer SCR. Further, the sacrificial layer SCR may be extended in the first direction D1.

The sacrificial layer SCR is formed in the area in which the liquid crystal LC is to be formed, and is formed to have a width and height respectively corresponding to the width and height of the tunnel-shaped cavity TSC. This is because the sacrificial layer SCR is removed to form the tunnel-shaped cavity TSC.

Figure 10A:
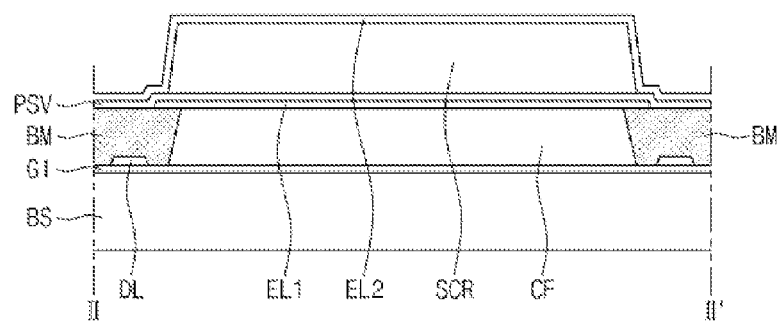
Figure 10B:
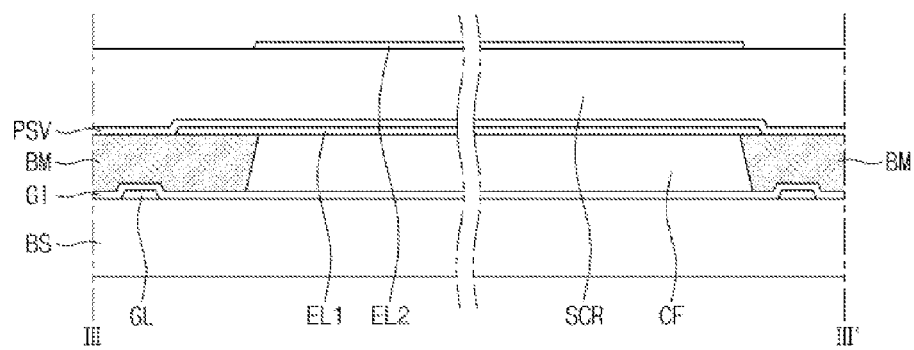

Referring to FIGS. 10A and 10B, the second electrode EL2 is formed on the sacrificial layer SCR (S150 in FIG. 3).

The second electrode EL2 is formed by forming a conductive layer on the sacrificial layer SCR, forming a photoresist pattern (not shown), and etching the conductive layer using the photoresist pattern as a mask.

The conductive layer is formed of, for example, any suitable transparent conductive material, such as, for example, ITO, IZO, ITZO, GZO, AZO, polyaniline, poly(3,4-ethylenedioxythiophene) poly(styrenesulfonate) (PEDOT:PSS), etc., using a physical vapor deposition method. It is contemplated, however, that any other suitable fabrication technique may be utilized.

The photoresist pattern is formed in the area in which the second electrode EL2 is formed. The photoresist pattern is formed by coating a photoresist on the conductive layer, exposing the photoresist, and developing the exposed photoresist. Then, the photoresist pattern PR is removed.

Figure 11A:
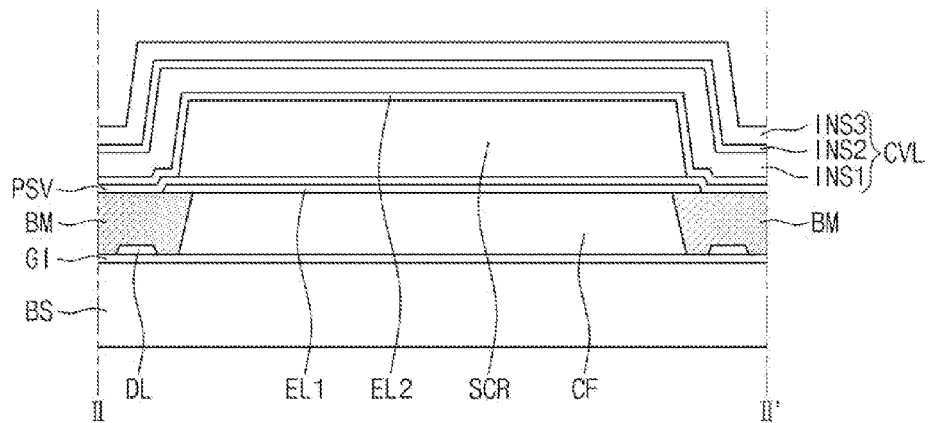
Figure 11B:
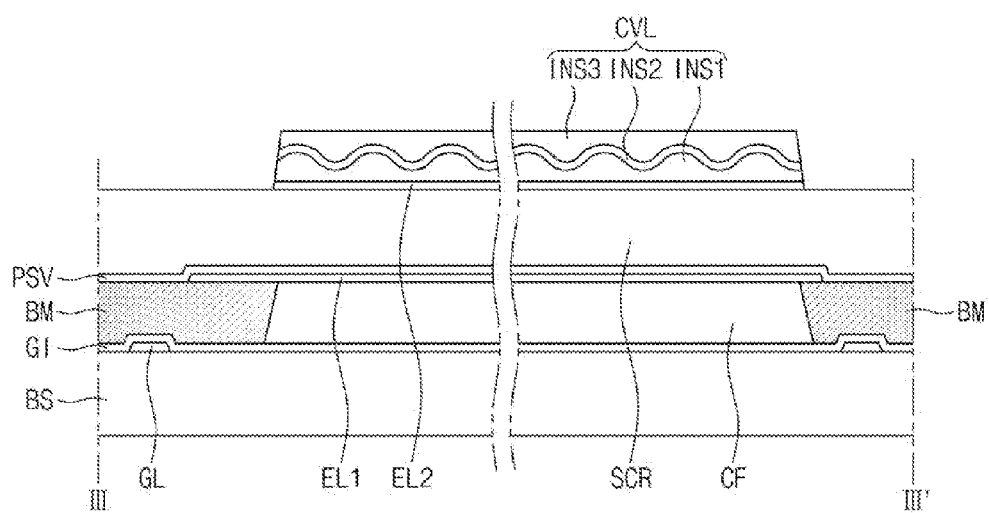

Referring to FIGS. 11A and 11B, the cover layer CVL is formed on the base substrate BS on which the second electrode EL2 is formed (S160 in FIG. 3).

The cover layer CVL extends in the first direction D1 (refer to FIG. 8) to cover the second electrode EL2. In exemplary embodiments, the second electrode EL2 and the cover layer CVL overlap each other when viewed in a plan view and have the same shape. However, it is contemplated that the cover layer CVL may have an area wider than that of the second electrode EL2 to completely cover the second electrode EL2 in consideration of one or more design margins. The cover layer CVL is not formed at both end portions of the display area DA in the second direction D2. In this manner, the upper surface of the sacrificial layer SCR corresponding to the end portions in the second direction D2 of the display area DA are exposed.

The cover layer CVL is formed by sequentially forming the first, second, and third insulating layers INS1, INS2, and INS3. The first insulating layer INS1 is formed of the organic insulating material and the concave-convex portion is formed on the upper surface of the first insulating layer INS1. The concave-convex portion is formed by forming the organic insulating material on the base substrate and patterning the organic insulating material using a photolithography process. The organic insulating material may be formed on the base substrate by an inkjet method or a slit coating method. It is contemplated, however, that any other suitable methods may be utilized.

The second insulating layer INS2 is formed of the inorganic insulating material using, for example, a chemical vapor deposition method. Again, any other suitable method may be utilized.

The third insulating layer INS3 is formed of the organic insulating material, and formed on the second insulating layer INS2 using, for instance, an inkjet method or a slit coating method. It is contemplated, however, that any other suitable method may be utilized.

The first insulating layer INS1 is formed thick enough to form the concave-convex portion. The second insulating layer INS2 may be thinner than the first insulating layer INS1. The second insulating layer INS2 includes the concave-convex portion formed thereon to correspond to the concave-convex portion of the first insulating layer INS1.

The third insulating layer INS3 may be thicker than the second insulating layer INS2 and may planarize the second insulating layer INS2.

Figure 12A:
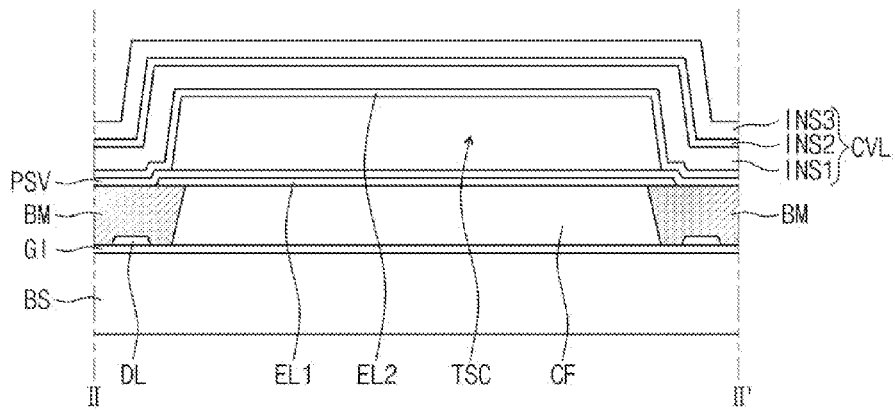
Figure 12B:
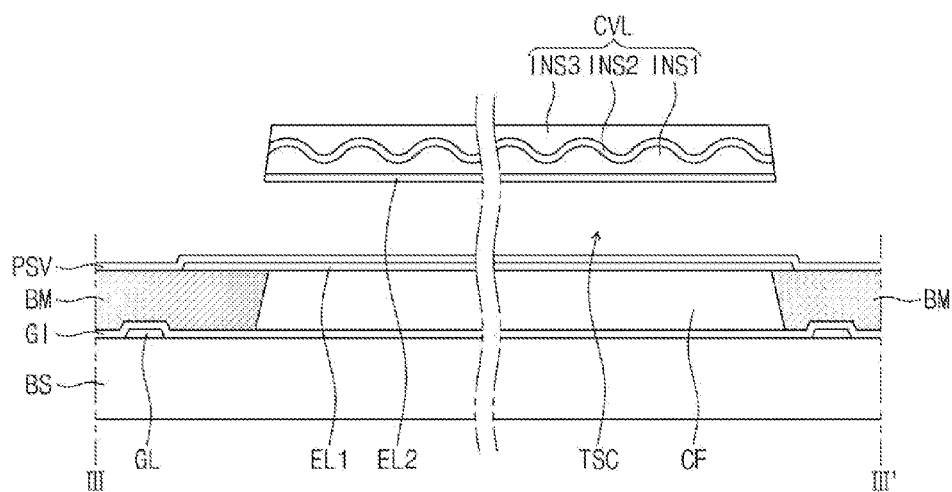

Referring to FIGS. 12A and 12B, the sacrificial layer SCR is removed by, for example, a dry etch process or a wet etch process to form the tunnel-shaped cavity TSC (S170 in FIG. 3). Any other suitable process may be utilized. The dry etch process may be performed using plasma and the wet etch process may be performed using various etchants according to materials used to form the sacrificial layer. The sacrificial layer SCR is etched from the exposed upper surface thereof. Thus, the upper surface of the passivation layer PSV and the lower surface of the second electrode EL2 are exposed, and the tunnel-shaped cavity TSC is defined by the upper surface of the passivation layer PSV, the lower surface of the second electrode EL2, and the both end portions in the second direction D2 of the display area DA.

In exemplary embodiments, an inorganic insulating layer (not shown) may be formed on the sacrificial layer SCR before the second electrode EL2 is formed and an additional inorganic insulating layer (not illustrated) may be formed on the second electrode EL2 before the cover layer CVL is formed. The inorganic insulating layers may be utilized to support the cover layer CVL to allow the cover layer CVL to stably support the tunnel-shaped cavity TSC when the sacrificial layer SCR is etched or otherwise removed.

Figure 13A:
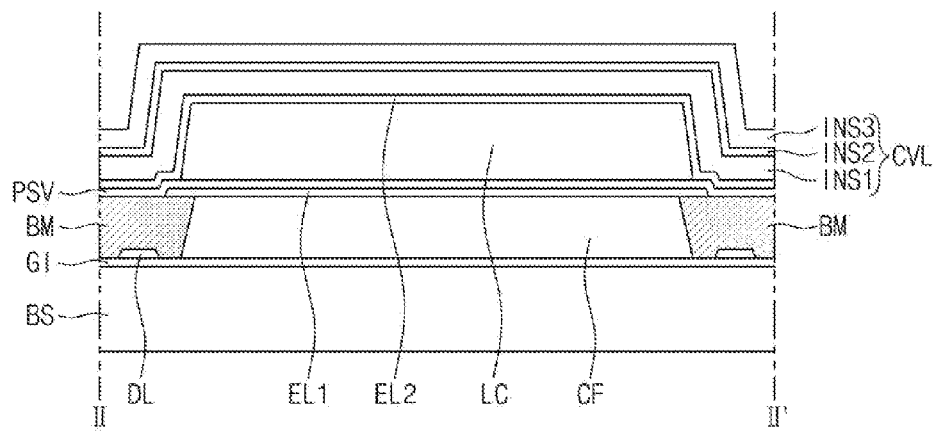
Figure 13B:
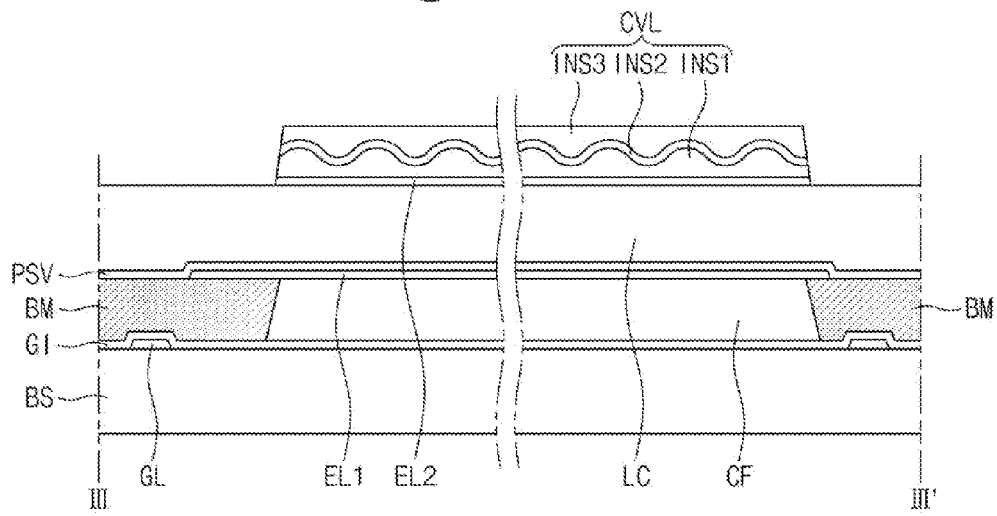

Referring to FIGS. 13A and 13B, the liquid crystal LC is formed (e.g., injected) in the tunnel-shaped cavity TSC (S180 in FIG. 3). Since the liquid crystal molecules are provided in, for example, a fluid state, the liquid crystal molecules move into the tunnel-shaped cavity TSC by capillary force (or suction) when the liquid crystal molecules are disposed sufficiently close to an opening of the tunnel-shaped cavity TSC. The liquid crystal molecules may be provided close to the tunnel-shaped cavity TSC using an inkjet device employing a micropipette. In this manner, the liquid crystal LC is provided in the tunnel-shaped cavity TSC and between the tunnel-shaped cavities adjacent to each other.

According to exemplary embodiments, the liquid crystal LC may be provided in the tunnel-shaped cavity TSC using a vacuum liquid crystal injection device. To this end, a portion of the base substrate BS in which the tunnel-shaped cavity TSC is formed may be dipped into a vessel in a chamber, in which a liquid crystal material is filled, and a pressure of the chamber may be lowered. In this manner, the liquid crystal material may be provided (e.g., injected) into the tunnel-shaped cavity TSC by a capillary force or suction.

Figure 14A:
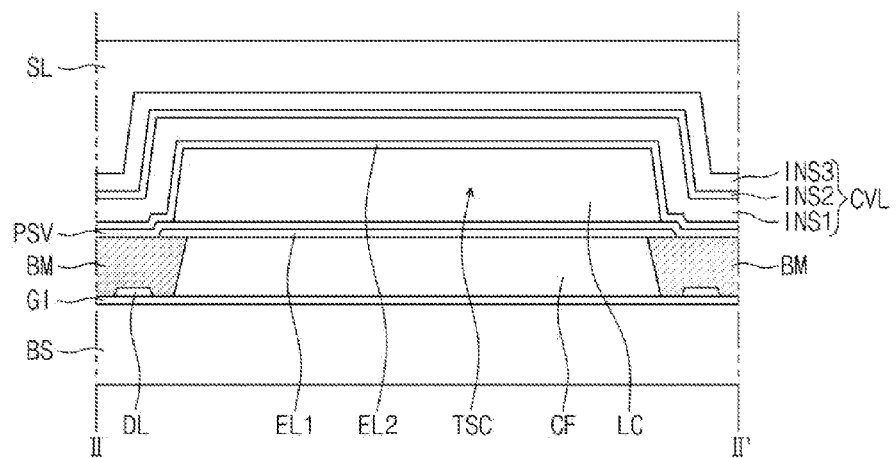
Figure 14B:
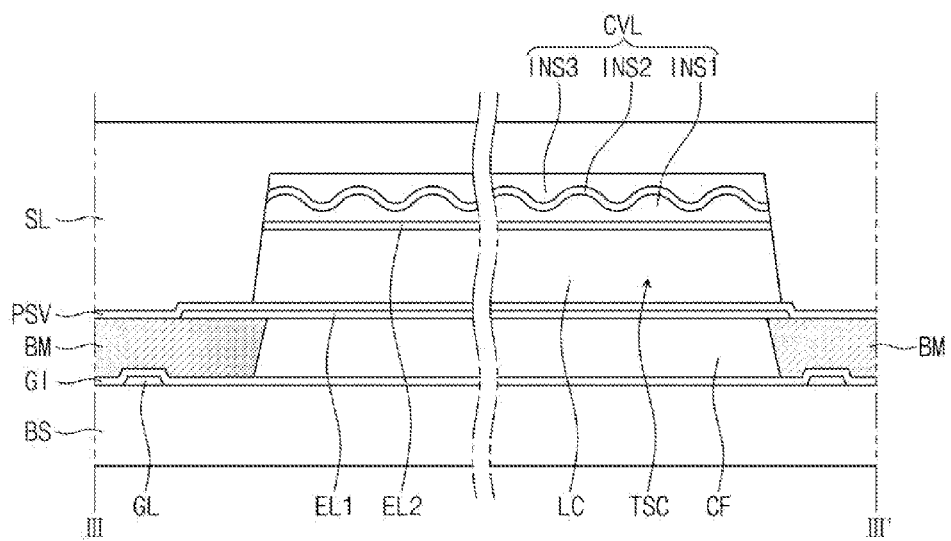

Referring to FIGS. 14A and 14B, extraneous liquid crystal LC is removed from areas except for the area in which the tunnel-shaped cavity TSC is formed, and the sealant layer SL is formed to surround the tunnel-shaped cavity TSC (S190 in FIG. 3). The sealant layer SL seals the opening portions of the tunnel-shaped cavity TSC, i.e., the entrance portions through which the liquid crystal molecules are injected.

In exemplary embodiments, the sealant layer SL may be formed by a vacuum deposition method using an organic polymer, e.g., poly(p-xylene)polymer (i.e., parylene).

Figure 15A:
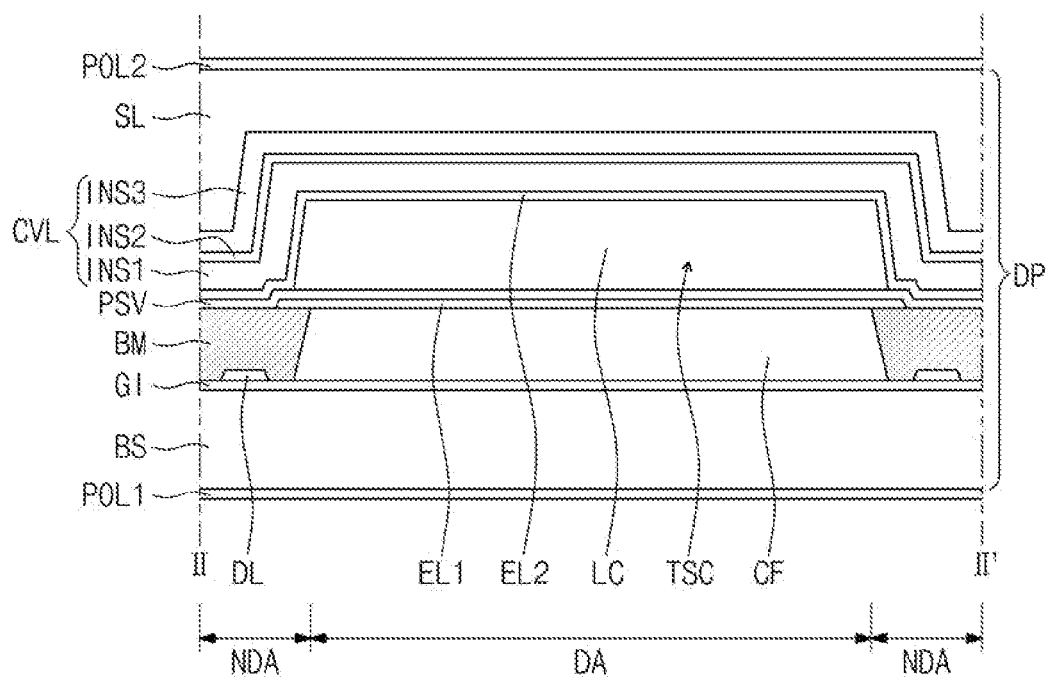
Figure 15B:
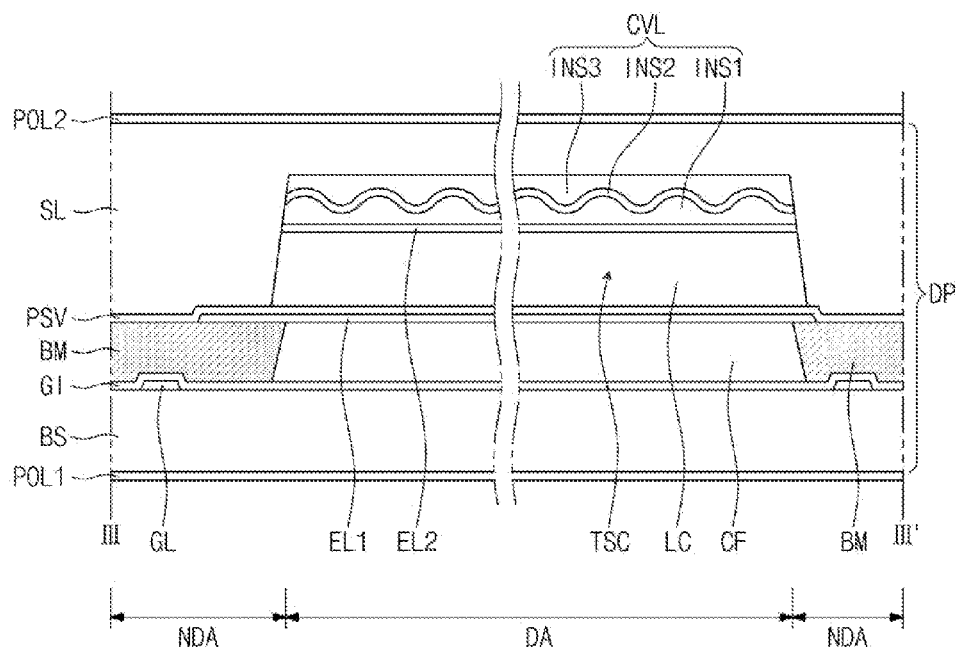

Referring to FIGS. 15A and 15B, the optical member is attached to the display panel DP (S200 in FIG. 3). The optical member may include the first and second polarizing plates POL1 and POL2. It is contemplated, however, that the optical member may include one or more other components, such as one or more of the previously described components.

In this manner, the coupling process of coupling two substrates is omitted when the exemplary display device is manufactured according to, for example, the illustrative process of FIG. 3. In addition, the number of substrates and the amount of liquid crystal molecules utilized may be reduced when compared to that of a conventional display device. Thus, manufacturing time and cost may be reduced. To this end, the display device, according to exemplary embodiments, may not be deformed even though stress occurs when the display device is being manufactured. In this manner, defects, which are typically caused by deformations during the manufacturing process, may be reduced or otherwise prevented.

Figure 16A:
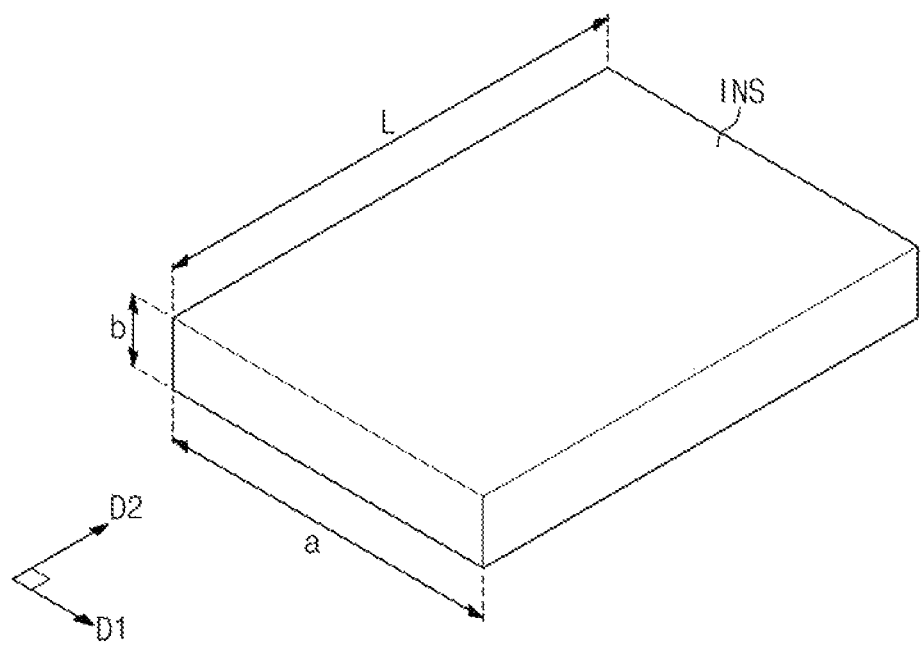
FIG. 16A is a perspective view of a conventional covering part.
Figure 16B:
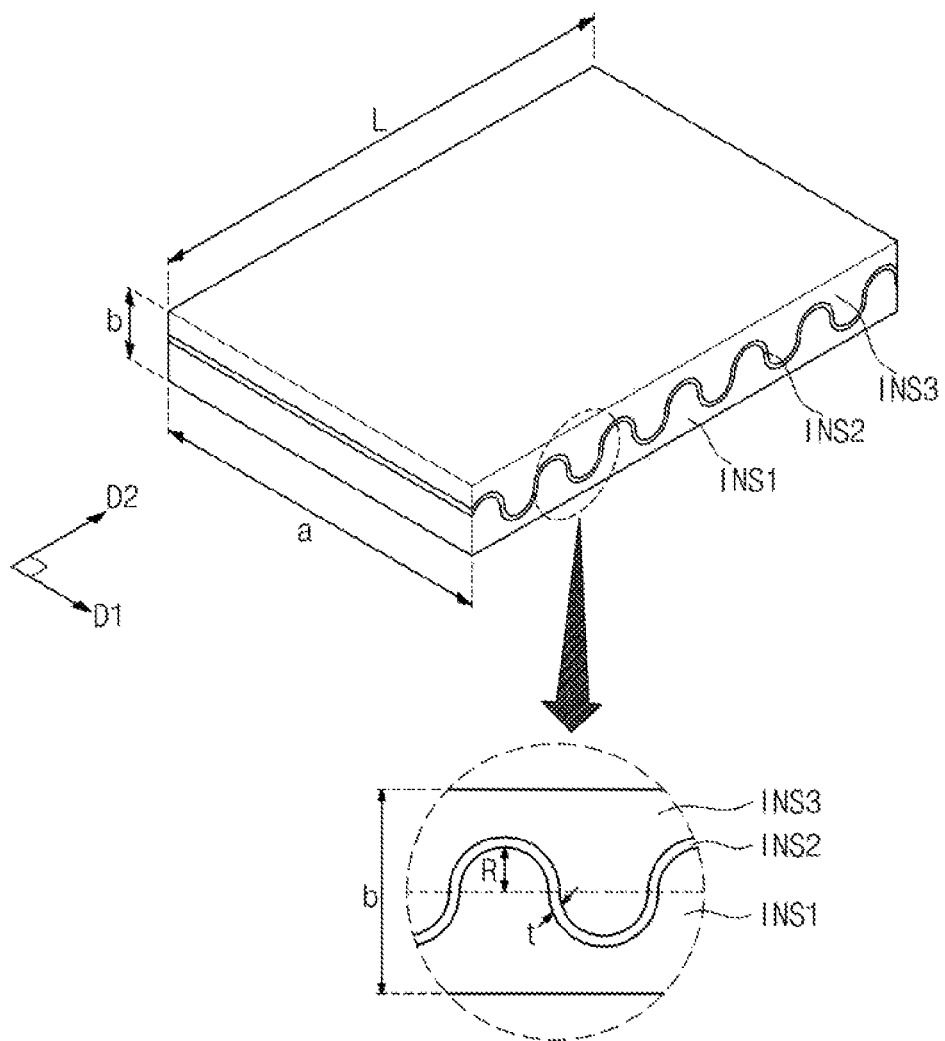
FIG. 16B is a perspective view of an illustrative covering part, according to exemplary embodiments.

FIG. 16A is a perspective view of a conventional covering part. FIG. 16B is a perspective view of an illustrative covering part, according to exemplary embodiments. The conventional covering part is formed using a single organic insulating layer, whereas the covering part according to exemplary embodiments (hereinafter, referred to as "present covering part") is formed using aforementioned organic insulating layer, inorganic insulating layer, and organic insulating layer, which may be sequentially formed as the first, second, and third insulating layers INS1, INS2, and INS3, respectively. The conventional covering part and the present covering part may have substantially the same width "a," thickness "b," and length "L." In addition, the present covering part includes the concave-convex portion formed by alternately and repeatedly arranging the concave portion and the convex portion, where each of the concave and convex portions has, for example, a semi-circular shape with radius of "R" when viewed in cross section. Further, the convex portions of the present covering part extend in the first direction D1 and are arranged in the second direction D2. In this manner, the second insulating layer INS2 may have a thickness "t."

In the conventional covering part and the present covering part, a stability of the tunnel-shaped cavity may be determined based on a bending rigidity of the covering part and a boundary condition of the sidewall portion supporting the covering part. Particularly, a degree of deformation ($\delta_{Max}$) of the tunnel-shaped cavity, which is caused by an external force, may be determined using the following Equation 1.

$$\delta_{Max} = \frac{wL^4}{384\,EI} \qquad \text{Equation 1}$$

In Equation 1, "w" denotes a uniform pressure downwardly applied to the covering part, L denotes a length of the covering part, E denotes an elastic modulus of the covering part, and I denotes a moment of inertia. When the width of the covering part is "a" and the thickness of the covering part is "b," the moment of inertia is $ab^3/12$. The uniform pressure downwardly applied to the covering part may be gravity, pressure caused by a fluid, or some other applied force.

As shown in Equation 1, a degree of sagging of the tunnel-shaped cavity is inversely proportional to the moment of inertia and the bending rigidity depends on the moment of inertia. When the elastic modulus of the conventional covering part is equal to the elastic modulus of the present covering part, the bending rigidity depends on the moment of inertia.

Accordingly, since the width and the thickness of the conventional covering part are "a" and "b," respectively, the moment of inertia is $ab^3/12$. In exemplary embodiments, since the width and the thickness of the present covering part are "a" and "b," respectively, and the second insulating layer INS2 having the concave-convex portion is inserted into the covering part, the moment of inertia (I) is represented by the following Equation 2.

$$I = \frac{ab^3}{12} + \frac{1}{4}\pi(R^2 - (R-t)^2) \times \frac{L}{4R-t} \quad \text{Equation 2}$$

In Equation 2, "R" denotes a radius of each of the concave portions and the convex portions, and "t" denotes the thickness of the second insulating layer INS2.

As shown in Equation 2, since $$\frac{1}{4}\pi(R^2 - (t)^2) \times \frac{t}{4R-t}$$

is greater than 0, the present covering part has a moment of inertia greater than that of the conventional covering part. The degree of the deformation ($\delta_{Max}$) of the tunnel-shaped cavity in the present covering part is reduced from that of the conventional covering part. In addition, since $$\frac{1}{4}\pi(R^2 - (R-t)^2) \times \frac{L}{4R-t}$$

is a function that relates variables "R" and "t," to the moment of inertia, the moment of inertia may be controlled (or otherwise modified) by adjusting "R" and "t."

Figure 17:
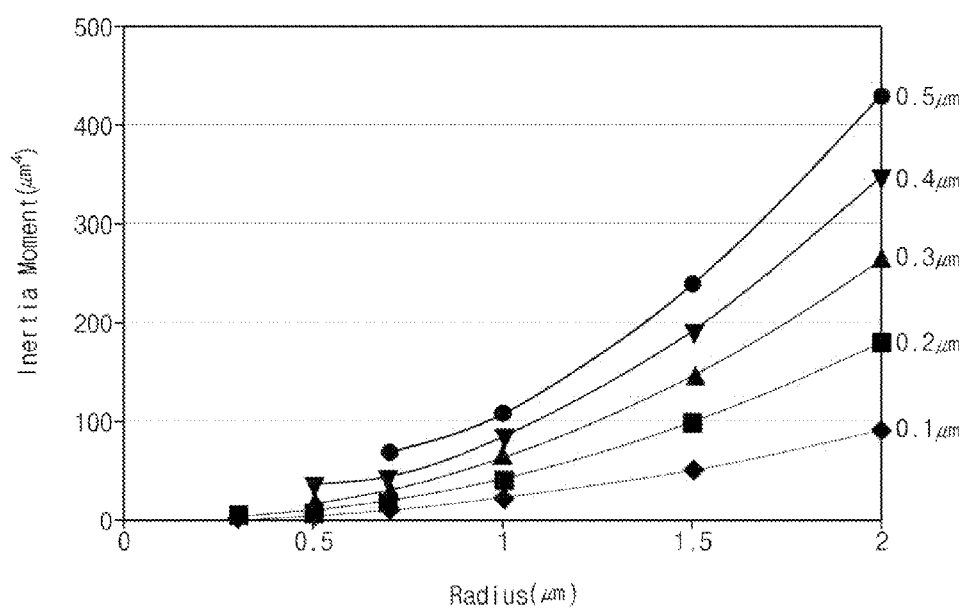
FIG. 17 is a graph of a moment of inertia as a function of a diameter of a convex portion of an insulating layer, according to exemplary embodiments.

FIG. 17 is a graph of a moment of inertia as a function of a diameter of a convex portion of an insulating layer, according to exemplary embodiments. To generate the data, a simulation was performed, and the covering part shown in FIG. 16B was used, with the length "L," the width "a," and the thickness "b" set to about 300 micrometers, about 200 micrometers, and about 4 micrometers, respectively. An x-axis indicates the radius "R" of each of the concave and convex portions and a y-axis indicates the moment of inertia.

To compare the bending rigidity of the conventional covering part with the bending rigidity of the present covering part with reference to the moment of inertia, influences caused by the elastic modulus were minimized. In general, the elastic modulus of the organic insulating layer is 1/200 times smaller than that of the inorganic insulating layer, and, as such, the second insulating layer INS2 formed of the inorganic insulating layer is set smaller than those of the first and third insulating layers INS1 and INS3 formed of the organic insulating layer. This minimizes the difference of the elastic modulus between the organic insulating layer and the inorganic insulating layer. The x-axis indicates the radius "R" of each of the concave and convex portions and the y-axis indicates the moment of inertia. The moment of inertia is measured when the thickness "t" of the second insulating layer INS2 is 0.1 micrometers, 0.2 micrometers, 0.3 micrometers, 0.4 micrometers, and 0.5 micrometers.

The moment of inertia of the conventional covering part shown in FIG. 16A is about 6.4 when the length "L," the width "a," and the thickness "b" are set to about 300 micrometers, about 200 micrometers, and about 4 micrometers, respectively. In comparison, the moment of inertia of the present covering part is greater than 6.4 as shown in FIG. 17.

In exemplary embodiments, when the thickness of the present covering part is about 4 micrometers, the thickness of the second insulating layer and the radius of each of the concave and convex portions have values represented by the following Table 1.

TABLE 1

| Thickness of Second Insulating Layer (t: μm) | Radius of each of the Concave and Convex Portions (t: μm) |
|---|---|
| 0.1 | 1.7 |
| 0.2 | 1.2 |
| 0.3 | 1.0 |
| 0.4 | 0.9 |
| 0.5 | 0.5 |

The cover layer may be deformed by a residual stress, e.g., a tensile force or a compressive force, of the material used to form the cover layer while the material for the cover layer is formed and patterned. That is, the deformation may occur on the covering part of the cover layer, which is spaced apart from the base substrate BS and parallel to the upper surface of the base substrate BS. For instance, a portion of the covering part is upwardly lifted or downwardly sagged. In other words, when a distance between the passivation layer PSV and the covering part is referred to as the cell gap, the cell gap is decreased or increased at or near of the entrance.

In addition, when an etchant is removed after the sacrificial layer is removed by a wet etch process or the solution for the alignment layer is removed, the covering part may be sagged by stiction caused, at least in part, by a surface tension of the fluid. When the covering part makes contact with the passivation layer PSV after being sagged, the cover part is maintained in the contact state with the passivation layer PSV due to Van der Waals forces. The surface tension of the fluid is expressed by a contact angle between the fluid and an inner surface of the tunnel-shape cavity TSC, e.g., the surface of the second electrode EL2, and acts on the entire surface of the covering part.

According to exemplary embodiments, however, since the concave-convex portion is formed in the portion of the covering part, the covering part may be prevented from being deformed. Thus, the variation of the cell gap is reduced and the tunnel-shaped cavity TSC may have uniform cell gap.

Figure 18:
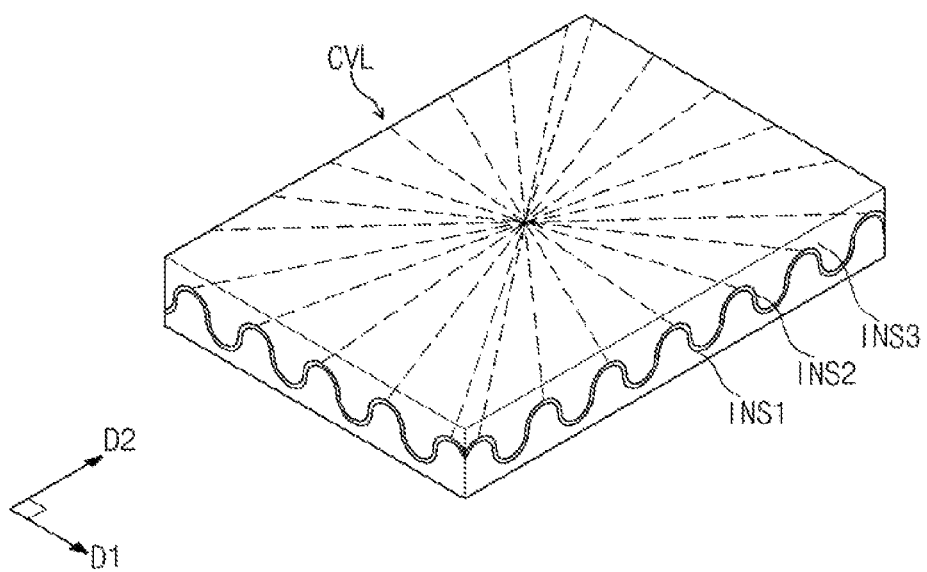
FIG. 18 is a perspective view of a covering part, according to exemplary embodiments.

FIG. 18 is a perspective view of a covering part, according to exemplary embodiments. In FIG. 18, different portions of the covering part, which are formed from those of the covering part shown in FIG. 16B, will be described.

Referring to FIG. 18, a cover layer CVL includes a first insulating layer INS1, a second insulating layer INS2, and a third insulating layer INS3, which are sequentially stacked. The concave-convex portion is provided on the upper surface of the first insulating layer INS1. The concave-convex portion may have various shapes. The concave-convex portion may have convex portions arranged in a radial shape with respect to the tunnel-shaped cavity when viewed in a plan view.

In addition, although not shown in drawings, the concave-convex portion may be provided in plural layers in the covering part. For instance, the upper surface of the third insulating layer is flat in the illustrated embodiments, but the concave-convex portion may be formed on the upper surface of the third insulating layer. Moreover, the inorganic and organic insulating layers may be further stacked on the third insulating layer.

Figure 19:
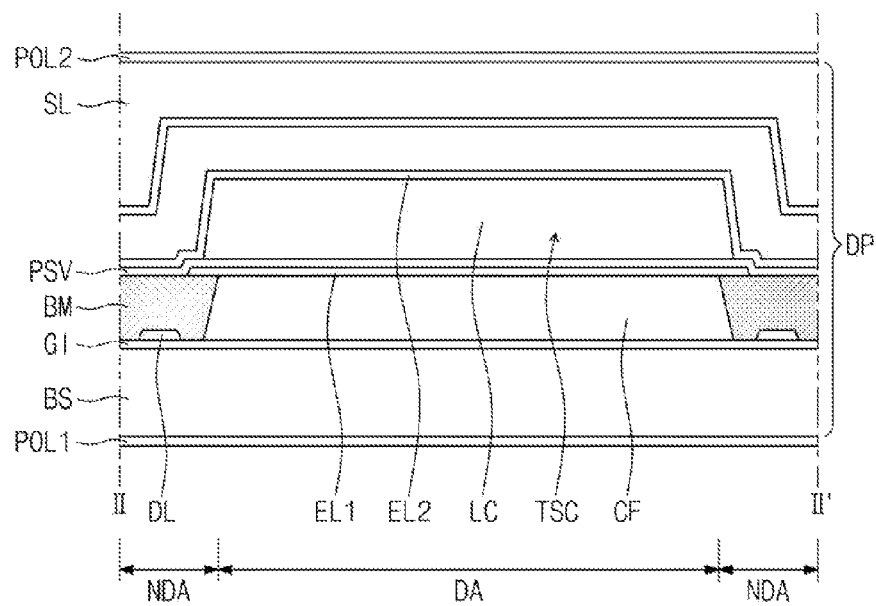
FIGS. 19 and 20 are respective cross-sectional views of a display device of FIG. 1 taken along sectional lines II-II' and III-III', according to exemplary embodiments.
Figure 20:
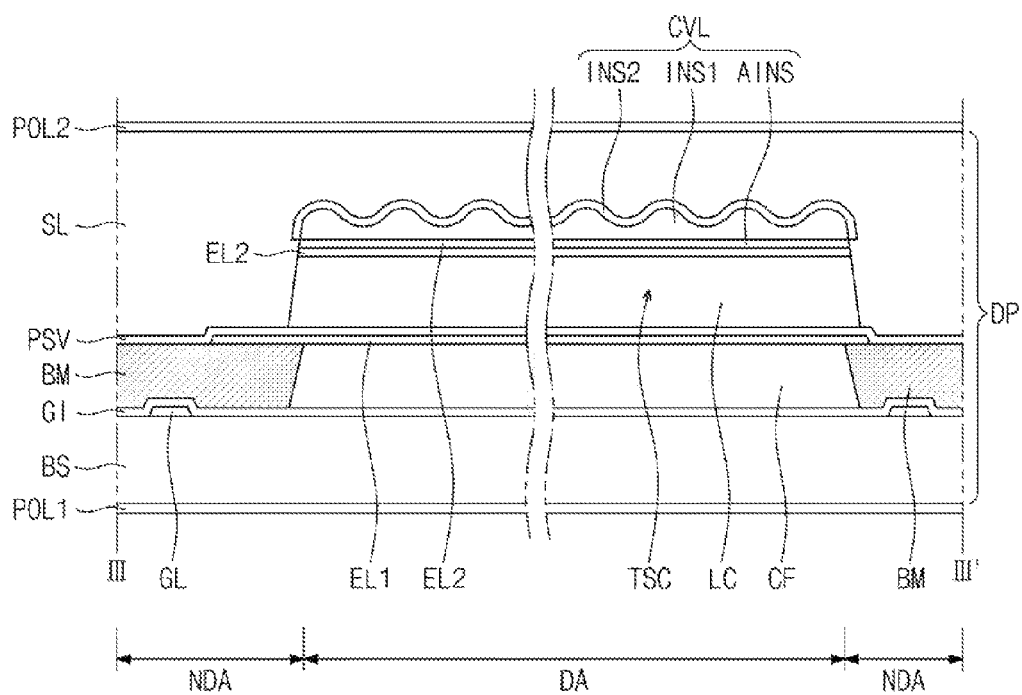

FIGS. 19 and 20 are respective cross-sectional views of a display device of FIG. 1 taken along sectional lines II-II' and III-III' according to exemplary embodiments. The configuration of the display device of FIGS. 19 and 20 is substantially similar to the display device of FIGS. 1-2C, and, therefore, to avoid obscuring exemplary embodiments described herein, differences are described below.

Referring to FIGS. 19 and 20, the third insulating layer may be omitted. In this manner, the cover part includes a first insulating layer INS1 formed with a concave-convex portion thereon and a second insulating layer INS2 formed on the first insulating layer INS1. The first insulating layer INS1 is formed of the organic insulating material and the second insulating layer INS2 is formed of the inorganic insulating material. Although the third insulating layer is omitted, the sealant layer SL is formed on the second insulating layer INS2, and, as such, the stability of the covering part may be maintained. Further, an additional insulating layer AINS may be provided under the first insulating layer INS1 to stably support the first insulating layer INS1. The additional insulating layer AINS is formed of the inorganic insulating material.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
   a substrate;
   a cover layer disposed on the substrate, the cover layer comprising a first insulating layer, the first insulating layer defining at least a portion of a tunnel-shaped cavity extending in a first direction;
   liquid crystal disposed in the tunnel-shaped cavity;
   electrodes disposed on the substrate, the electrodes being configured to apply an electric field to the liquid crystal; and
   a sealant layer disposed on the substrate, the sealant layer covering the cover layer and the tunnel-shaped cavity, the sealant layer being configured to seal the tunnel-shaped cavity,
   wherein the first insulating layer comprises:
      a covering part spaced apart from the substrate, the covering part extending substantially parallel to an upper surface of the substrate; and
      a sidewall part that extends from the covering part towards the substrate, and
   wherein the covering part comprises a concave-convex surface.

2. The display device of claim 1, wherein the cover layer further comprises:
   a second insulating layer disposed on the first insulating layer.

3. The display device of claim 2, wherein:
   the second insulating layer comprises an inorganic insulating material.

4. The display device of claim 3, wherein:
   the inorganic insulating material comprises at least one of silicon nitride and silicon oxide.

5. The display device of claim 2, wherein the cover layer further comprises:
   a third insulating layer disposed on the second insulating layer.

6. The display device of claim 5, wherein:
   each of the first insulating layer and the third insulating layer comprises an organic insulating material.

7. The display device of claim 6, wherein:
   the first insulating layer and the third insulating layer comprise the same material.

8. The display device of claim 1, wherein:
   the concave-convex surface comprises convex portions longitudinally extending in the first direction.

9. The display device of claim 1, wherein:
   the concave-convex surface comprises convex portions longitudinally extending in a second direction crossing the first direction.

10. The display device of claim 1, wherein:
    the concave-convex surface comprises convex portions arranged in a radial shape with respect to a center portion of the tunnel-shaped cavity when viewed in a plan view.

11. The display device of claim 1, wherein:
    the cover layer comprises at least one more layer; and
    plural layers of the cover layer comprise concave-convex surfaces.

12. The display device of claim 1, wherein:
    the concave-convex surface comprises convex portions of a circular cross-sectional shape, a portion of an ovular cross-sectional shape, or a polygonal cross-sectional shape.

13. A method of manufacturing a display device, comprising:
    forming a first electrode on a substrate;
    forming a sacrificial layer on the substrate, the sacrificial layer extending in a first direction;
    forming a second electrode on the sacrificial layer;
    forming a cover layer comprising a concave-convex surface on the sacrificial layer;
    removing the sacrificial layer to form a tunnel-shaped cavity between the first electrode and the second electrode;
    forming an image display part in the tunnel-shaped cavity; and
    forming a sealant layer to seal the tunnel-shaped cavity.

14. The method of claim 13, wherein forming the cover layer comprises:
    forming a first insulating layer;
    patterning a surface of the first insulating layer to form the concave-convex surface; and
    forming a second insulating layer on the first insulating layer.

15. The method of claim 14, wherein:
    the concave-convex surface is patterned via one or more photolithography processes.

16. The method of claim 14, further comprising:
    forming a third insulating layer on the second insulating layer.

17. The method of claim 16, wherein:
    the first insulating layer and the third insulating layer comprise an organic insulating material.

18. The method of claim 17, wherein:
    the first insulating layer and the third insulating layer are formed of the same material.

19. The method of claim 14, wherein the second insulating layer comprises an inorganic insulating material.

* * * * *